(12) United States Patent
Braker et al.

(10) Patent No.: US 10,571,668 B2
(45) Date of Patent: Feb. 25, 2020

(54) CATADIOPTRIC PROJECTOR SYSTEMS, DEVICES, AND METHODS

(71) Applicant: Cognex Corporation, Natick, MA (US)

(72) Inventors: Benjamin Braker, Louisville, CO (US); Eric D. Moore, Longmont, CO (US)

(73) Assignee: Cognex Corporation, Natick, MA (US)

( * ) Notice: Subject to any disclaimer, the term of this patent is extended or adjusted under 35 U.S.C. 154(b) by 69 days.

(21) Appl. No.: 15/149,719

(22) Filed: May 9, 2016

(65) Prior Publication Data

US 2017/0023780 A1    Jan. 26, 2017

Related U.S. Application Data

(60) Provisional application No. 62/159,228, filed on May 9, 2015.

(51) Int. Cl.
| | |
|---|---|
| *G02B 13/06* | (2006.01) |
| *H04N 5/225* | (2006.01) |
| *G02B 13/16* | (2006.01) |
| *G01B 11/25* | (2006.01) |

(52) U.S. Cl.
CPC .......... *G02B 13/06* (2013.01); *G01B 11/2513* (2013.01); *G02B 13/16* (2013.01); *H04N 5/2256* (2013.01)

(58) Field of Classification Search
None
See application file for complete search history.

(56) References Cited

U.S. PATENT DOCUMENTS

| | | | |
|---|---|---|---|
| 4,687,326 | A | 8/1987 | Corby |
| 4,705,401 | A | 11/1987 | Addleman |
| 5,825,933 | A | 10/1998 | Hecht |

(Continued)

FOREIGN PATENT DOCUMENTS

| | | |
|---|---|---|
| DE | 4206836 | 9/1999 |
| EP | 1247070 | 10/2007 |

(Continued)

OTHER PUBLICATIONS

Cordova-Esparza, D., et al., "A Panoramic 3D Reconstruction System Based on the Projection of Patterns", International Journal of Advanced Robotic Systems 11:55, pp. 1-11 (2014).*

(Continued)

*Primary Examiner* — Lindsay J Uhl

(57) ABSTRACT

Catadioptric projector systems, devices, and methods are provided in accordance with various embodiments. For example, some embodiments include a catadioptric projector that may include: a radiation source; a static pattern generating element and/or a time-varying pattern generating element configured to condition radiation from the radiation source to produce the patterned illumination; and/or a convex reflector positioned to project the patterned illumination. Some embodiments include a system that includes a catadioptric projector and a camera configured to acquire one or more images based on the patterned illumination. Systems and methods in accordance with various embodiments are provided to estimate a distance to a point on an object based on the one or more acquired images.

27 Claims, 15 Drawing Sheets

(56) References Cited

U.S. PATENT DOCUMENTS

| | | | |
|---|---|---|---|
| 6,057,892 A | 5/2000 | Borer | |
| 6,076,738 A | 6/2000 | Bloomberg | |
| 6,304,285 B1 | 10/2001 | Geng | |
| 6,341,016 B1 | 1/2002 | Malione | |
| 6,441,888 B1 | 8/2002 | Azuma | |
| 6,449,103 B1 | 9/2002 | Charles | |
| 6,751,344 B1 | 6/2004 | Grumbine | |
| 6,754,370 B1 | 6/2004 | Hall-Holt | |
| 7,002,699 B2 | 2/2006 | Kong | |
| 7,013,040 B2 | 3/2006 | Shiratani | |
| 7,103,212 B2 | 9/2006 | Hager | |
| 7,164,789 B2 | 1/2007 | Chen | |
| 7,433,024 B2 | 10/2008 | Garcia | |
| 7,768,656 B2 | 8/2010 | Lapa | |
| 7,804,997 B2 | 9/2010 | Geng | |
| 8,050,461 B2 | 11/2011 | Shpunt | |
| 8,090,194 B2 | 1/2012 | Golrdon | |
| 8,150,142 B2 | 4/2012 | Freedman | |
| 8,208,719 B2 | 6/2012 | Gordon | |
| 8,350,847 B2 | 1/2013 | Shpunt | |
| 8,384,997 B2 | 2/2013 | Shpunt | |
| 8,531,650 B2 | 9/2013 | Feldkhun | |
| 8,538,166 B2 | 9/2013 | Gordon | |
| 8,717,417 B2 | 5/2014 | Sali | |
| 8,749,796 B2 | 6/2014 | Pesach | |
| 8,786,682 B2 | 7/2014 | Shpunt | |
| 8,836,921 B2 | 9/2014 | Feldkhun | |
| 8,908,277 B2 | 12/2014 | Pesach | |
| 8,982,182 B2 | 3/2015 | Shpunt | |
| 9,066,087 B2 | 6/2015 | Shpunt | |
| 9,239,389 B2 * | 1/2016 | Jeong | G01S 17/00 |
| 9,562,760 B2 | 2/2017 | Braker | |
| 9,696,137 B2 | 7/2017 | Braker | |
| 2004/0246473 A1 | 12/2004 | Hermary | |
| 2006/0192925 A1 | 8/2006 | Chang | |
| 2007/0046924 A1 | 3/2007 | Chang | |
| 2007/0109527 A1 | 5/2007 | Wenstrand | |
| 2007/0115484 A1 | 5/2007 | Huang | |
| 2007/0177160 A1 | 8/2007 | Sasaki | |
| 2007/0268398 A1 | 11/2007 | Raskar | |
| 2008/0118143 A1 | 5/2008 | Gordon | |
| 2010/0201811 A1 | 8/2010 | Garcia | |
| 2010/0225746 A1 | 9/2010 | Shpunt | |
| 2011/0134220 A1 | 6/2011 | Barbour | |
| 2012/0063672 A1 | 3/2012 | Gordon | |
| 2013/0108104 A1 * | 5/2013 | Sonoda | B25J 9/1612 382/103 |
| 2013/0250066 A1 | 9/2013 | Abraham | |
| 2014/0022348 A1 | 1/2014 | Shpunt | |
| 2017/0205495 A1 | 7/2017 | Braker | |
| 2018/0045503 A1 | 2/2018 | Braker | |

FOREIGN PATENT DOCUMENTS

| | | |
|---|---|---|
| WO | WO2007043036 | 4/2007 |
| WO | WO2010006081 | 1/2010 |

OTHER PUBLICATIONS

Orghidan Radu, "Catadioptric Stereo based on Structured Light Projection", PhD Thesis, Universitat de Girona (2006) ("Orghidan").*

Esparza, D., et al., "A Panoramic 3D Reconstruction System Based on the Projection of Patterns", International Journal of Advanced Robotic Systems 11:55, pp. 1-11 (2014) (Year: 2014).*

Zhang, Chi, et al., "Development of an omni-directional 3D camera for robot navigation", 2012 IEEE/ASME International Conference on Advanced Intelligent Mechatronics (Jul. 11-14, 2012) (Year: 2012).*

Orghidan, Radu, "Catadioptric Stereo based on Structured Light Projection", PhD Thesis, Universitat de Girona (2006) (Year: 2006).*

Cordova-Esparza, D., et al., "A Panoramic 3D Reconstruction System Based on the Projection of Patterns", International Journal of Advanced Robotic Systems 11:55, pp. 1-11 (2014) (Year: 2014).*

Rosen, J. et al., "Non-scanning motionless fluorescence three-dimensional holographic microscopy", Nature Photonics, vol. 2, pp. 190-195 (Mar. 2008) (Year: 2008).*

Cordova-Esparza, D., et al., "A Panoramic 3D Reconstruction System Based on the Projection of Patterns", International Journal of Advanced Robotic Systems 11:55 (2014) (Year: 2014).*

Nayar, Shree K. "Catadioptric omnidirectional camera." Proceedings of IEEE Computer Society Conference on Computer Vision and Pattern Recognition, Jun. 17, 1997, pp. 482-488.

Gluckman, Joshua, et al. "Real-time omnidirectional and panoramic stereo." Proceedings of the Image Understanding Workshop. vol. 1., 1998, pp. 299-303.

Strelow, Dennis, et al. "Precision Omnidirectional Camera Calibration.", Proceedings of the 2001 IEEE Computer Society Conference on Computer Vision and Pattern Recognition. vol. 1. Dec. 2001.

Yi, Sooyeong, et al. "Real-time Omni-Directional Distance Measurement with active Panoramic Vision," International Journal of Control, Automation, and Systems, vol. 5, No. 2, Apr. 2007, pp. 184-191.

Geyer, Christopher, et al. "Catadioptric Camera Calibration." Proceedings of the 7th IEEE International Conference on Computer Vision, vol. 1, 1999, pp. 398-404.

Zhang, Chi, et al. "Development of an omni-directional 3D camera for robot navigation." The 2012 IEEE/A SME International Conference on Advanced Intelligent Mechatronics, Jul. 11-14, 2012, Kaosiung, Taiwan, pp. 262-267.

Baker, Simon, et al. "A Theory of Catadioptric Image Formation." Proceedings of the 6th International Conference on Computer Vision, IEEE, Bombay, Jan. 1998, pp. 35-42.

Agarwal, A., N. Agarwal, C. Rajasekhar, and R. Patel, Performance Analysis of 2-D Optical Codes with Cross Correlation Value of One and Two in Optical CDMA System, International Journal of Electrical Engineering & Communication Engineering for Applied Research, vol. 52, No. 1, Jan.-Jun. 2012, pp. 21-29.

Anna, Tulsi, et al., "Sinusoidal Fringe Projection System Based on Compact and Non-Mechanical Scanning Low-Coherence Michelson Interferometer for Three-Dimensional Shape Measurement," Optics Communications 282; 1237-1242, 2008.11.080.

Chang, Ming, et al., "High Speed Three-Dimensional Profilometry Utilizing Laser Diode Arrays," Optical Engineering, vol. 42 No. 12, pp. 3595-3599 (Dec. 2003).

Chen, Frank, et al., "Overview of Three-Dimensional Shape Measurement Using Optical Methods," Optical Engineering, vol. 39, No. 1, pp. 10-22 (Jan. 2000).

Coggrave, C. R., "High-speed Surface Profilometer Based on a Spatial Light Modulator and Pipeline Image Processor," Optical Engineering, vol. 38, No. 9, pp. 1573-1581 (Sep. 1999).

Geng, Jason, "Structured-light 3D surface Imaging: a Tutorial," Advances in Optics and Photonics vol. 3, 128-160 (2011).

Gorthi, Sai Siva, et al., "Fringe Projection Techniques: Whither we are?" Optics and Lasers in Engineering vol. 48, No. 2:133-140, 2010.

Guan, Chun, Laurence G. Hassebrook, Daniel L. Lau, Veeraganesh Yalla, "Near-infrared composite pattern Projection for continuous motion hand—computer interaction," Journal of Visual Communication and Image Representation, vol. 18, Issue 2, Apr. 2007, pp. 141-150, ISSN 1047-3203, http://dx.doi.org/10.1016/j.ivcir.2006.11.006.

Guo, Hongwei, Mingyi Chen, and Peng Zheng, "Least-squares fitting of carrier phase distribution by using a rational function in fringe projection profilometry: erratum," Opt. Lett. 32, 487-487 (2007).

Handley, John C., Edward R. Dougherty, Maximum-Likelihood Estimation for the Two-Dimensional Discrete Boolean Random Set and Function Models Using Multidimensional Linear Samples, Graphical Models and Image Processing, vol. 59, Issue 4, Jul. 1997, pp. 221-231, ISSN 1077-3169, http://dx.doi.org/10.1006/gmip.1997.0432.

Harding, Kevin, "Challenges and opportunities for 3D optical metrology: what is needed today from an industry perspective," Proc. SPIE 7066, Two- and Three-Dimensional Methods for Inspection and Metrology VI, 70660F (Aug. 29, 2008).

(56) References Cited

OTHER PUBLICATIONS

Huang, Peisen S., et al. "Color-Encoded Digital Fringe Projection Technique for High-Speed three-dimensional Surface Contouring," Optical Engineering vol. 38 No. 6, pp. 1065-1071 (Jun. 1999).

Huang, Peisen S., et al., "High-Speed 3-D Shape Measurement based on Digital Fringe Projection," Optical Engineering vol. 42, No. 1, pp. 163-168 (Jan. 2003).

Huntley, J.M., et al., "Shape Measurement by Temporal Phase Unwrapping and Spatial Light Modulator-based Fringe Projector," SPIE vol. 3100; Sep. 25, 1997; 0277-786X.

Kazovsky, L. G., "Beam position estimation by means of detector arrays," Optical and Quantum Electronics, vol. 13, p. 201-208. (May 1981).

Kinell, Lars, "Multichannel Method for Absolute Shape Measurement Using Projected Fringes," Optics and Lasers in Engineering vol. 41 (2004) pp. 57-71.

Li, E. B., et al., "Multi-Frequency and Multiple Phase-Shift Sinusoidal Fringe Projection for 3D Profilometry," Optics Express vol. 13, No. 5, pp. 1561-1569; Mar. 7, 2005.

Liu, Kai, "Dual-Frequency Pattern Scheme for High-Speed 3-D Shape Measurement," Optics Express, vol. 18, No. 5, pp. 5229-5244, Mar. 1, 2010.

Mermelstein, Michael S., et al., "Video-rate Surface Profiling with Acousto-Optic Accordion Fringe interferometry," Optical Engineering vol. 39, No. 1, pp. 106-113, Jan. 2000.

Pan, Jiahul, et al., "Color Phase-Shifting Technique for three-Dimensional Shape Measurement," Optical Engineering vol. 45, No. 1, 013602, Jan. 2006.

Peng, Xiang, et al., "Three-Dimensional Vision with Dual Acousto-optic Deflection Encoding," Optics Letters, vol. 30, No. 15, pp. 1965-1967, Aug. 1, 2005.

Sainov, Ventseslav, et al., "Real Time Phase Stepping Pattern Projection Profilometry," Proc. of SPIE, vol. 6341, Sep. 15, 2006.

Salvi, Joaquim, et al., "Pattern Codification Strategies in Structured Light Systems," Pattern Recognition the Journal of the Pattern Recognition Society, vol. 37 (2004), pp. 827-849.

Schirripa-Spagnolo, Giuseppe and Dario Ambrosini, "Surface contouring by diffractive optical element-based fringe projection," Measurement Science and Technology 12, N6 (2001).

Skydan, Oleksandr, et al., "Technique for Phase Measurement and Surface Reconstruction by Use of Colored Structured Light," Applied Optics, vol. 41, No. 29, Oct. 10, 2002.

Stoykova, Elena, et al., "Pattern Projection with a Sinusoidal Phase Grating," Hindawi Publishing Corporation EURASIP Journal on Advances in Signal Processing, vol. 2009, article ID 351626, 10 pages, May 13, 2008.

Su, Wei-Hung, Cho-Yo Kuo, Chun-Chieh Wang, and Chung-Fan Tu, "Projected fringe profilometry with multiple measurements to form an entire shape," Opt. Express 16, 4069-4077 (2008).

Wang, Yongchang, et al., "Maximum SNR Pattern Strategy for Phase Shifting Methods in Structured light Illumination," Journal Optical Society of America, vol. 27, No. 9, pp. 1962-1971, Sep. 2010.

Wyant, J. "Computerized interferometric surface measurements [Invited]," Appl. Opt. 52, 1-8 (2013).

Yin, Xuebing, et al., "Acoustic Grating Fringe Projector for High-Speed and High-Precision three-Dimensional Shape Measurements," Applied Optics, vol. 46, No. 15, pp. 3046-3051, May 20, 2007.

Zhang, Song, "Recent progresses on Real-Time 3D Shape Measurement Using Digital Fringe Projection Techniques," Journal Optics and Lasers in Engineering, Elsevier, 0143-8166, Mar. 8, 2009.

Bourke, Paul. "Using a spherical mirror for projection into immersive environments." Proceedings of the 3rd international conference on Computer graphics and interactive techniques in Australasia and South East Asia. Dunedin: Graphite (ACM Siggraph), 2005, pp. 281-284.†

Cordova-Esparza, Diana-Margarita, et al. "A panoramic 3D reconstruction system based on the projection of patterns." International Journal of Advanced Robotic Systems 11.4 (2014): 55.†

Orghidan, Radu. Catadioptric stereo based on structured light projection. PhD Thesis, Universitat de Girona (2006).†

\* cited by examiner
† cited by third party

CATADIOPTRIC PROJECTOR SYSTEMS, DEVICES, AND METHODS

CROSS-REFERENCES TO RELATED APPLICATIONS

This application is a non-provisional patent application claiming priority benefit of U.S. provisional patent application Ser. No. 62/159,228, filed on May 9, 2015 and entitled "CATADIOPTRIC STRUCTURED LIGHT FOR OMNIDIRECTIONAL DEPTH SENSING," the entire disclosure of which is herein incorporated by reference for all purposes.

BACKGROUND

Different embodiments relate in general to catadioptric systems, devices, and methods.

Catadioptric cameras generally make use of a divergent reflector coupled with a refractive imaging lens that may produce images with a full 360 degree azimuthal field of view. There may, however, be a general need for tools and techniques that may utilize catadioptric systems, devices, and methods for a variety of purposes.

SUMMARY

Catadioptric projector systems, devices, and methods are provided in accordance with various embodiments.

For example, some embodiments include a system that may include a catadioptric projector configured to produce patterned illumination. The catadioptric projector may include: a radiation source; a static pattern generating element configured to condition radiation from the radiation source to produce the patterned illumination; and/or a convex reflector positioned to project the patterned illumination. The system may include a camera configured to acquire one or more images based on the patterned illumination. In some embodiments, the system includes a processor configured to estimate a distance to a point on an object based on the one or more acquired images.

In some embodiments of the system, the patterned illumination includes at least an amplitude modulation in at least one spatial dimension, two spatial dimensions, or three spatial dimensions. The patterned illumination may include an arrangement of dots. The arrangement of dots may be uncorrelated.

In some embodiments of the system, the amplitude modulation may be configured to include multiple spatial symbols, where each spatial symbol may be distinguishable from the other spatial symbols of the multiple spatial symbols. Each respective spatial symbol of the multiple spatial symbols may be similar to a master spatial symbol such that a peak of a normalized spatial cross correlation of the master spatial symbol and each respective spatial symbol may exceed a threshold.

In some embodiments of the system, the camera includes a catadioptric camera. In some embodiments, the catadioptric projector includes a primary optical axis, the catadioptric camera includes a primary optical axis, and the primary axes of the catadioptric projector and the catadioptric camera are substantially collinear. In some embodiments, the catadioptric projector includes a lens.

In some embodiments of the system, the static pattern generating element includes at least a mask, a diffractive optical element, or a hologram. In some embodiments, the convex reflector includes at least a section of a hyperboloid, a paraboloid, an ellipsoid, a pyramid, or a cone. In some embodiments the convex reflector is rotationally symmetric. In some embodiments, the patterned illumination is projected over an azimuthal field of view of 360 degrees.

In some embodiments of the system, the patterned illumination is time-varying. The time-varying patterned illumination may include a sequence of illumination patterns with two or more of the sequence of illumination patterns varying sinusoidally along a spatial dimension and the two or more sinusoidally varying patterns having at least a different spatial frequency or a different phase. In some embodiments, the time-varying patterned illumination includes a sequence of illumination patterns with two or more of the sequence of illumination patterns including a stripe patterns and the two or more stripe patterns having at least a different spatial frequency or a different phase. In some embodiments, an azimuthal field of view of the catadioptric projector is 360 degrees. In some embodiments, the camera includes a catadioptric camera. An azimuthal field of view the catadioptric camera may be 360 degrees. In some embodiments, the catadioptric projector includes a primary optical axis, the catadioptric camera includes a primary optical axis; and the primary axes of the catadioptric projector and the catadioptric camera are substantially collinear.

Some embodiments include a catadioptric projector. The catadioptric projector may include: a radiation source; a static pattern generating element configured to condition radiation from the radiation source to produce patterned illumination; and/or a convex reflector positioned to project the patterned illumination.

In some embodiments of the catadioptric projector, the patterned illumination includes at least an amplitude modulation in at least one spatial dimension, two spatial dimensions, or three spatial dimensions. In some embodiments, the patterned illumination includes an arrangement of dots. The arrangement of dots may be uncorrelated.

In some embodiments of the catadioptric projector, the amplitude modulation is configured to include multiple spatial symbols. Each spatial symbol may be distinguishable from the other spatial symbols of the multiple spatial symbols. In some embodiments, each respective spatial symbol of the multiple spatial symbols is similar to a master spatial symbol such that a peak of a normalized spatial cross correlation of the master spatial symbol and each respective spatial symbol exceeds a threshold.

In some embodiments of the catadioptric projector, the catadioptric projector includes a lens. In some embodiments, the static pattern generating element includes at least a mask, a diffractive optical element, or a hologram. In some embodiments, the convex reflector includes at least a section of a hyperboloid, a paraboloid, an ellipsoid, a pyramid, or a cone. In some embodiments, the convex reflector is rotationally symmetric. In some embodiments, the patterned illumination is projected over an azimuthal field of view of 360 degrees.

In some embodiments of the catadioptric projector, the patterned illumination is time-varying. The time-varying patterned illumination may include a sequence of illumination patterns with two or more of the sequence of illumination patterns varying sinusoidally along a spatial dimension and the two or more sinusoidally varying patterns having at least a different spatial frequency or a different phase. The time-varying patterned illumination may include a sequence of illumination patterns with two or more of the sequence of illumination patterns including a stripe patterns and the two or more stripe patterns having at least a different spatial frequency or a different phase. In some embodiments, an azimuthal field of view the catadioptric projector is 360 degrees.

Some embodiments include a method that may include: illuminating a scene with patterned illumination using a catadioptric projector with a static pattern generating element; and acquiring one or more images of the scene. Some embodiments include estimating a distance to a point on an object in the scene based on the one or more acquired images. The patterned illumination may be time varying. Some embodiments include comparing the one or more acquired images with one or more stored reference images. In some embodiments, the patterned illumination includes multiple spatial symbols, where each spatial symbol is distinguishable from the other spatial symbols of the multiple spatial symbols; estimating a distance to a point on an object in the scene based on the one or more acquired images may include identification of one or more spatial symbols of the multiple spatial symbols.

Some embodiments include a system that may include a catadioptric projector configured to produce time-varying patterned illumination and a camera configured to acquire one or more images based on the time-varying patterned illumination. The time-varying patterned illumination may include a sequence of illumination patterns with two or more of the sequence of illumination patterns varying sinusoidally along a spatial dimension and the two or more sinusoidally varying patterns having at least a different spatial frequency or a different phase. In some embodiments, the time-varying patterned illumination includes a sequence of illumination patterns with two or more of the sequence of illumination patterns including a stripe patterns and the two or more stripe patterns having at least a different spatial frequency or a different phase.

In some embodiments of the system, the azimuthal field of view the catadioptric projector is 360 degrees. The camera may include a catadioptric camera. In some embodiments, the azimuthal field of view the catadioptric camera is 360 degrees. In some embodiments of the system, the catadioptric projector includes a primary optical axis, the catadioptric camera includes a primary optical axis, and/or the primary axes of the catadioptric projector and the catadioptric camera are substantially collinear. Some embodiments of the system include a processor configured to estimate a distance to a point on an object based on the one or more acquired images of the object.

Some embodiments include a catadioptric projector that may include a radiation source configured to generate time-varying patterned illumination and a convex reflector positioned to project the time-varying patterned illumination. The radiation source may be configured to generate the time-varying patterned illumination through the use of a time-varying pattern generating element that may be integrated or separate from the radiation source.

In some embodiments of the catadioptric projector, the time-varying patterned illumination includes a sequence of illumination patterns with two or more of the sequence of illumination patterns varying sinusoidally along a spatial dimension and the two or more sinusoidally varying patterns having at least a different spatial frequency or a different phase. In some embodiments of the catadioptric projector, the time-varying patterned illumination includes a sequence of illumination patterns with two or more of the sequence of illumination patterns including a stripe patterns and the two or more stripe patterns having at least a different spatial frequency or a different phase. In some embodiments, an azimuthal field of view of the catadioptric projector is 360 degrees.

Some embodiments include a method that may include illuminating a scene with time-varying patterned illumination using a catadioptric projector and acquiring one or more images of the scene. The method may include estimating a distance to a point on an object in the scene based on the one or more acquired images. Some embodiments may include comparing the one or more acquired images with one or more stored reference images.

Some embodiments include methods, systems, and/or devices as described in the detailed description and/or shown in the figure.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
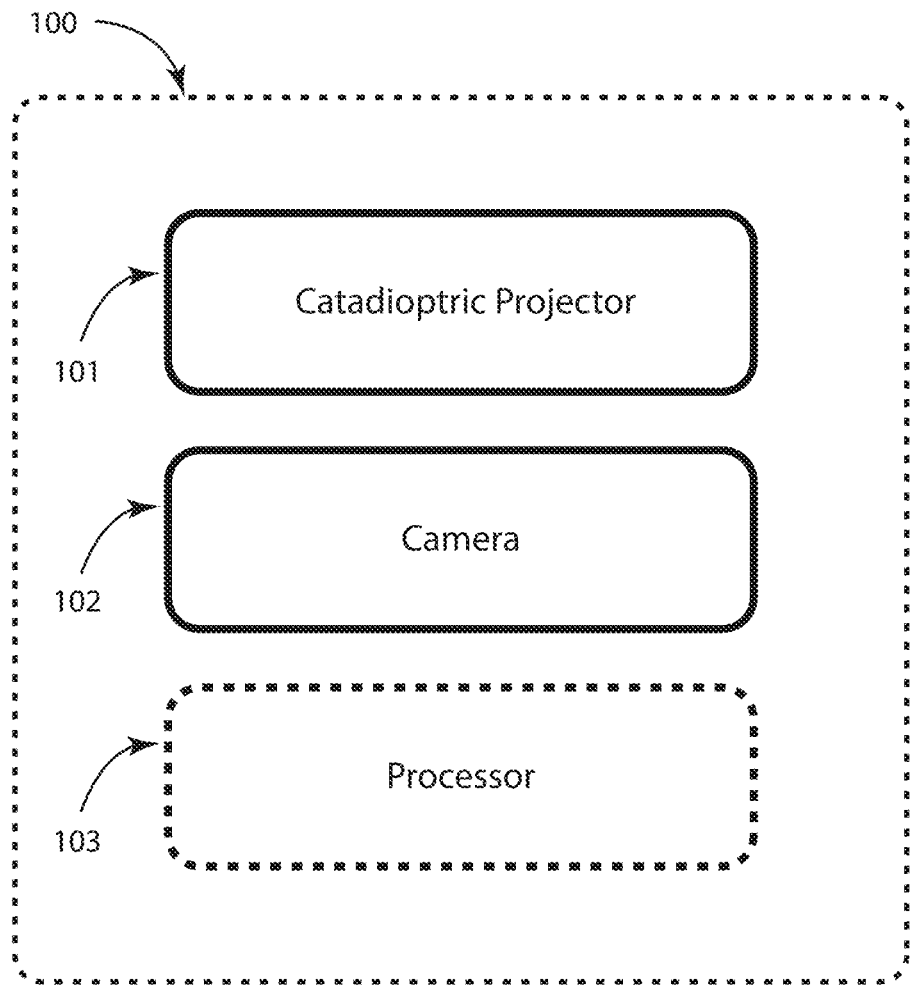
FIG. 1 shows a system in accordance with various embodiments.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments, it being understood that various changes may be made in the function and arrangement of elements without departing from the spirit and scope of the invention as set forth in the appended claims. Several embodiments are described herein, and while various features are ascribed to different embodiments, it should be appreciated that the features described with respect to one embodiment may be incorporated within other embodiments as well. By the same token, however, no single feature or features of any described embodiment should be considered essential to every embodiment, as other embodiments may omit such features.

Specific details are given in the following description to provide a thorough understanding of the embodiments. However, it will be understood by one of ordinary skill in the art that the embodiments may be practiced without these specific details. For example, systems, networks, processes, and other elements in embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process or method, which may be depicted as a flowchart, a flow diagram, a structure diagram, or a block diagram in some cases. Although a flowchart may describe the operations as a sequential process, many of the operations can be performed in parallel or concurrently. In addition, the order of the operations may be rearranged. A process may be terminated when its operations are completed, but could also comprise additional operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Catadioptric projector systems, devices, and methods are provided in accordance with various embodiments. For example, some embodiments include a catadioptric projector that may include: a radiation source; a static pattern generating element and/or a time-varying pattern generating element configured to condition radiation from the radiation source to produce the patterned illumination; and/or a convex reflector positioned to project the patterned illumination. Some embodiments include a system that includes a catadioptric projector and a camera configured to acquire one or more images based on the patterned illumination. Systems and methods are provided to estimate a distance to a point on an object based on the one or more acquired images.

FIG. 1 illustrates a system 100 in accordance with various embodiments. System 100 may be utilized for estimating a distance to a point on an object in a scene, for example. In general, a scene may include one or more objects and/or a portion of one or more objects. Some embodiments include a catadioptric projector 101. The catadioptric projector 101 may include a radiation source. The catadioptric projector 101 may illuminate the scene with patterned illumination. The catadioptric projector 101 may utilize a static pattern generating element and/or time-varying pattern generating element in some embodiments. The patterned illumination may be projected over a field of view. In some embodiments, the catadioptric projector 101 may include a convex reflector positioned to project the patterned illumination. The catadioptric projector 101 may include one or more lenses. The extent of the field of view may be described in terms of an azimuthal angle and an elevation angle. The azimuthal field of view may span an angle of 360 degrees, or it may span an angle of less than 360 degrees. The illumination pattern may include a modulation of one or more characteristics of the illumination radiation. For example, the patterned illumination may include a modulation of a radiation amplitude. Alternatively, or in addition, the pattern may include a modulation of a radiation frequency, a radiation phase, or a radiation polarization, for example. In some embodiments, the patterned illumination may include a spatial amplitude modulation. The spatial modulation may include, for example, an arrangement of dots, a sinusoidal pattern, and/or a stripe pattern. In some embodiments, the illumination pattern may be uncorrelated, such as an uncorrelated arrangement of dots. In some embodiments, the spatial amplitude modulation may be configured to include multiple spatial symbols; each spatial symbol may be distinguishable from the other spatial symbols in the multiple spatial symbols. In some embodiments, each respective spatial symbol of the multiple spatial symbols may be similar to a master spatial symbol such that a peak of a normalized spatial cross correlation of the master spatial symbol and each respective spatial symbol exceeds a threshold. Each spatial symbol may be configured such that each side lobe, from multiple side lobes, of the normalized spatial cross correlation of the master spatial symbol and each respective spatial symbol is less than a predetermined threshold. In some embodiments, the patterned illumination may include a temporal amplitude modulation. For example, the patterned illumination may include a sequence of sinusoidal patterns with varying phase and/or frequency. In some embodiments, the patterned illumination may include a sequence of stripe patterns with varying width and/or shifts. The patterned illumination may vary continuously or discretely in time.

The system 100 of FIG. 1 may include a camera 102. The camera may be configured to acquire images of the scene, for example. The acquired images may include patterned illumination projected by the catadioptric projector that has been reflected or scattered by objects or elements in the scene. The camera may be a catadioptric camera. The camera may collect an image over a field of view. The extent of the field of view may be described in terms of an azimuthal angle and an elevation angle. The azimuthal field of view may span an angle of 360 degrees, or it may span an angle of less than 360 degrees. In some embodiments of system 100, the catadioptric projector 101 includes a primary optical axis, the camera 102 as a catadioptric camera includes a primary optical axis, and the primary axes of the catadioptric projector 101 and the catadioptric camera 102 are substantially collinear.

In some embodiments, the system 100 may be configured for estimating the distance to a point on an object in a scene; the system may include an optional processor 103. The processor 103 may execute a method for estimating the distance to a point on an object in a scene based on one or more images acquired by the camera 102. The processor 103 may include a central processing unit (CPU), a graphics processing unit (GPU), a field-programmable gate array (FPGA), a digital signal processor (DSP), and/or an application-specific integrated circuit (ASIC). The processor 103 may be physically integrated with the other components of the system 100, or it may be located remotely. Information transfer to or from the processor 103 may include wired or wireless protocols, or a combination thereof.

In some embodiments, the processor 103 is embedded in a common enclosure with the catadioptric projector and/or the camera. In some embodiments, the processor 103 may be a host computer, to which the camera is connected via a universal serial bus connection or an ethernet connection. In some embodiments, the processor 103 may be a centralized server in communication with one or more cameras and/or projectors over the internet. In some embodiments, the processor 103 may be a mobile computing device such as a smartphone or tablet computer.

Figure 2A:
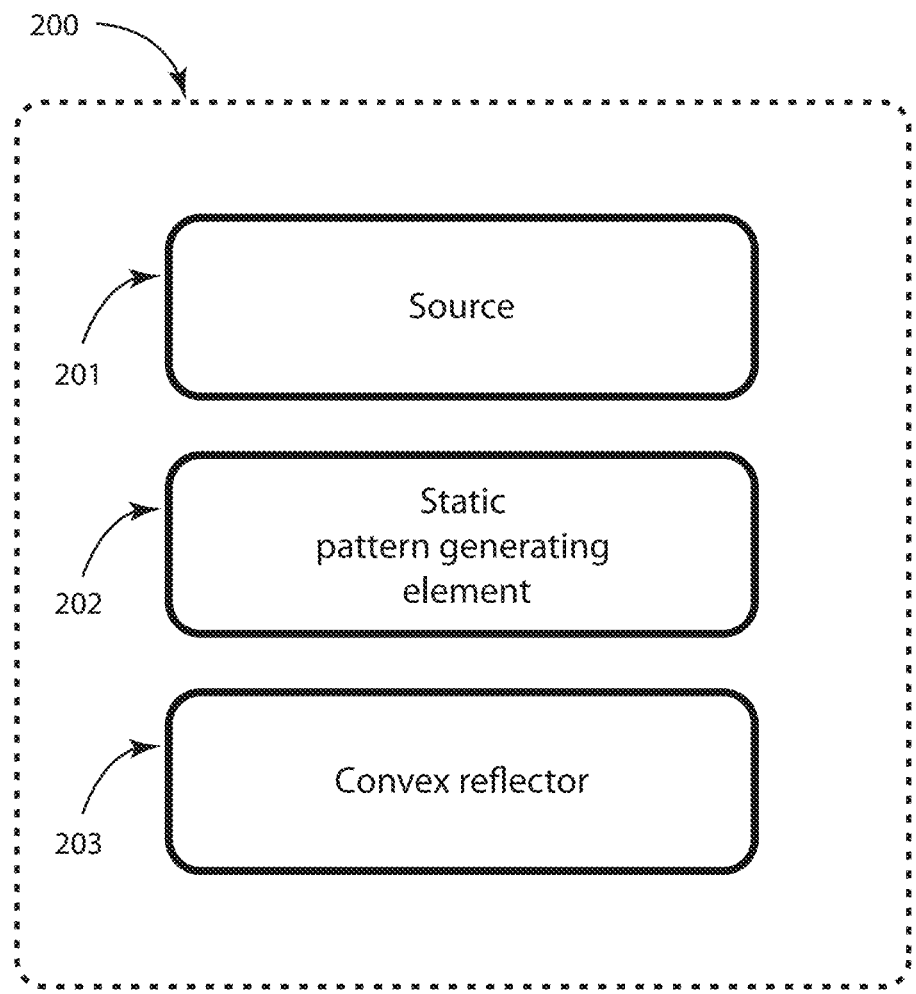
FIG. 2A and FIG. 2B show catadioptric projectors in accordance with various embodiments.

Turning to FIG. 2A, a catadioptric projector 200 in accordance with various embodiments is provided. The catadioptric projector 200 may be an example of the catadioptric projector 101 shown in FIG. 1. The catadioptric projector 200 may include a radiation source 201. Examples of radiation sources 201 that may be used in various embodiments include, but are not limited to, a laser diode, a vertical-cavity surface-emitting laser (VCSEL) array, a light-emitting diode (LED), and/or a lamp.

Some embodiments of the catadioptric projector 200 may include a static pattern generating element 202. The static pattern generating element 202 may condition the radiation emitted by the radiation source 201 to include a spatial distribution of a radiation characteristic, such as an amplitude, a frequency, and/or a polarization. In some embodiments, the static pattern generating element 202 may be part of the radiation source 201 itself. An arrangement of VCSELs on a substrate, for example, may act as both a radiation source 201 and a static pattern generating element 202. In some embodiments, the static pattern generating element 202 may be distinct from the radiation source 201. For example, the static pattern generating element 202 may include a mask, such as a chrome-on-glass mask. In some embodiments, the static pattern generating element 202 may include a diffractive optical element or a hologram. Various embodiments of catadioptric projector 200 may include a lens.

In some embodiments, the catadioptric projector 200 may generate patterned illumination that includes at least an amplitude modulation in at least one spatial dimension, two spatial dimensions, or three spatial dimensions. The patterned illumination may include an arrangement of dots in some embodiments. The arrangement of dots may be uncorrelated. In some embodiments, the amplitude modulation may be configured to include multiple spatial symbols, where each spatial symbol may be distinguishable from the other spatial symbols of the multiple spatial symbols. Each respective spatial symbol of the multiple spatial symbols may be similar to a master spatial symbol such that a peak of a normalized spatial cross correlation of the master spatial symbol and each respective spatial symbol may exceed a threshold.

Some embodiments of catadioptric projector 200 may include a convex reflector 203. Some catadioptric projectors 200 in accordance with various embodiments including a convex reflector 203 may be able to achieve larger fields of view than projectors that do not include a convex reflector. The shape of the convex reflector 203 may determine the angular distribution of the patterned illumination. The shape may be chosen to optimize the angular distribution for pattern projection, image capture, or both. In some embodiments, the shape of the convex reflector 203 may be chosen to be a surface of revolution of a conic section, such as a paraboloid, hyperboloid, and/or ellipsoid. In some embodiments, the convex reflector 203 may be a pyramid. In some embodiments, the convex reflector 203 includes at least a section of a hyperboloid, a paraboloid, an ellipsoid, a pyramid, or a cone. In some embodiments, the convex reflector 203 is rotationally symmetric. In some embodiments, the patterned illumination is projected over an azimuthal field of view of 360 degrees.

Figure 2B:
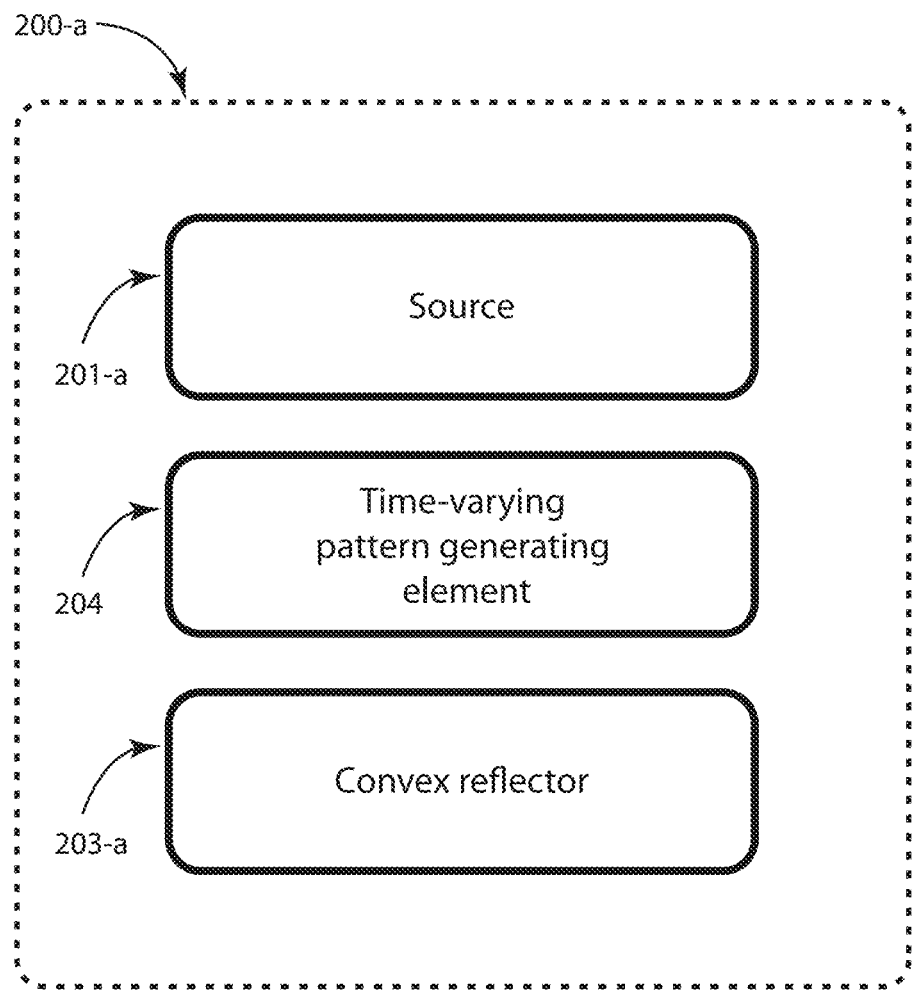

Turning to FIG. 2B, a catadioptric projector 200-a in accordance with various embodiments is provided. The catadioptric projector 200-a may be an example of the catadioptric projector 101 shown in FIG. 1. The catadioptric projector 200-a may include a radiation source 201-a. Examples of radiation sources 201-a that may be used in various embodiments include, but are not limited to, a laser diode, a vertical-cavity surface-emitting laser (VCSEL) array, a light-emitting diode (LED), and/or a lamp. Aspects of catadioptric projector 200-a may be in common and/or integrated with catadioptric projector 200 of FIG. 2A.

Some embodiments of the catadioptric projector 200-a may include a time-varying pattern generating element 204. The time-varying pattern generating element 202-a may condition the radiation emitted by the radiation source 201-a to include a spatial distribution of a radiation characteristic, such as an amplitude, a frequency, and/or a polarization. In some embodiments, the time-varying pattern generating element 204 may be part of the radiation source 201-a itself. In some embodiments where the source is a VCSEL array, for example, and one or more elements of a VCSEL array may be modulated in time, then the VSEL array may act as both the radiation source 201-a and the time-varying pattern generating element 204. In some embodiments, the time-varying pattern generating element 204 may be distinct from the radiation source 201-a. In some embodiments, the time-varying pattern generating element 204 may include a digital micromirror device (DMD), a liquid crystal display (LCD), a liquid crystal on silicon (LCOS) display, a microelectromechanical system (MEMS) scanning mirror, and/or other time-varying pattern generating element. Various embodiments of projector 200-a may include a lens.

In some embodiments of the catadioptric projector 200-a, the time-varying pattern generating element 240 may be configured to generate time-varying pattern illumination that includes a sequence of illumination patterns with two or more of the sequence of illumination patterns varying sinusoidally along a spatial dimension and the two or more sinusoidally varying patterns having at least a different spatial frequency or a different phase. In some embodiments, the time-varying pattern generating element 204 may be configured to generate time-varying patterned illumination that may include a sequence of illumination patterns with two or more of the sequence of illumination patterns including a stripe patterns and the two or more stripe patterns having at least a different spatial frequency or a different phase.

Some embodiments of a catadioptric projector 200-a may include a convex reflector 203-a. Some catadioptric projectors 200-a in accordance with various embodiments including a convex reflector 203-a may be able to achieve larger fields of view than projectors that do not include a convex reflector. The shape of the convex reflector 203-a may determine the angular distribution of the patterned illumination. The shape may be chosen to optimize the angular distribution for pattern projection, image capture, or both. In some embodiments, the shape of the convex reflector 203-a may be chosen to be a surface of revolution of a conic section, such as a paraboloid, hyperboloid, and/or ellipsoid. In some embodiments, the convex reflector 203-a may be a pyramid. In some embodiments, the convex reflector 203-a includes at least a section of a hyperboloid, a paraboloid, an ellipsoid, a pyramid, or a cone. In some embodiments the convex reflector 203-a is rotationally symmetric. In some embodiments, the patterned illumination is projected over an azimuthal field of view of 360 degrees. In some embodiments, an azimuthal field of view the catadioptric projector 200-a is 360 degrees.

Aspects of catadioptric projector 200-a may be in common and/or integrated with catadioptric projector 200 of FIG. 2A. For example, some embodiments may include both a static pattern generating element 202 and/or a time-varying pattern generating element.

Figure 3:
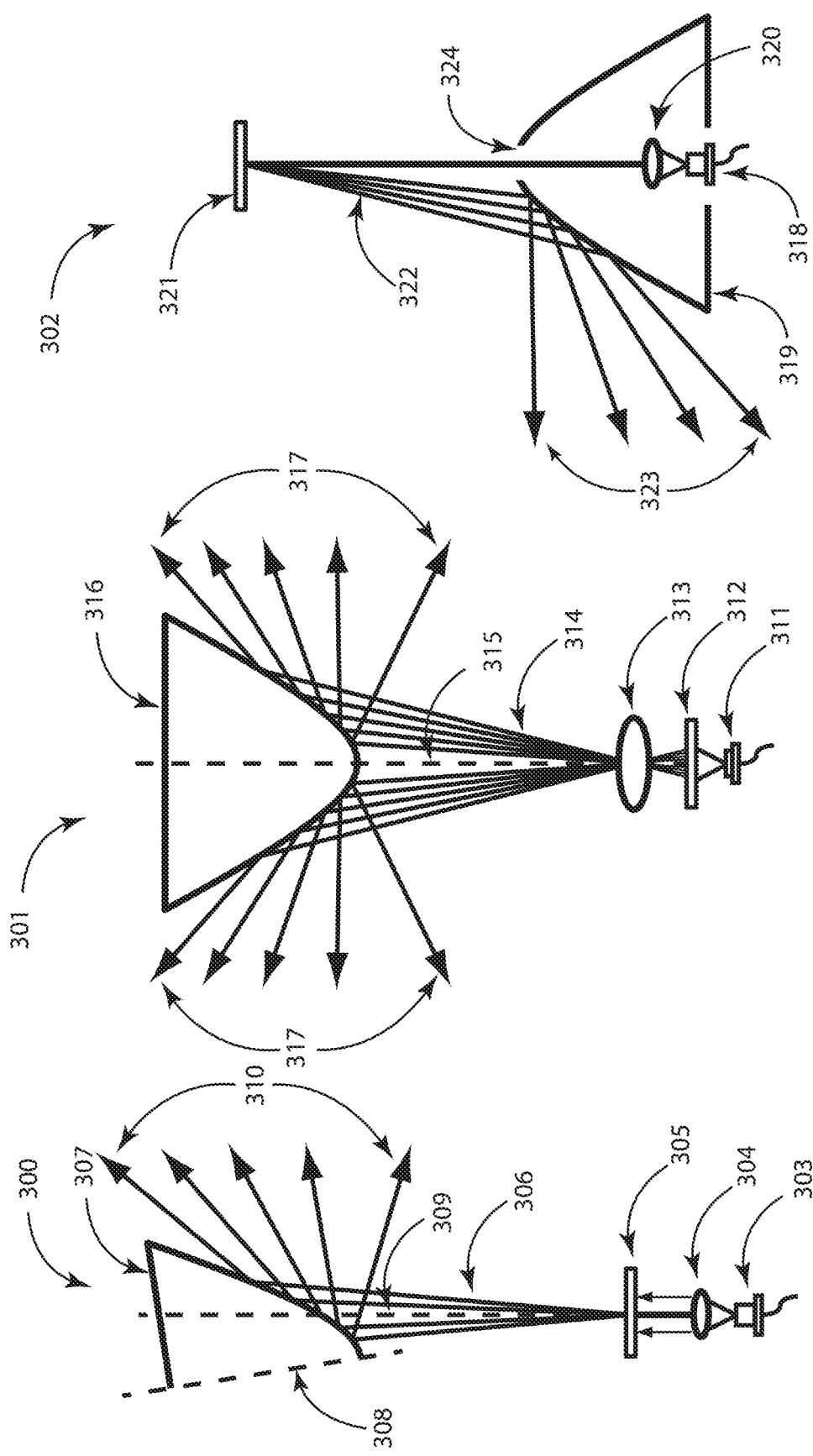
FIG. 3 shows catadioptric projectors in accordance with various embodiments.

Referring now to FIG. 3, examples of catadioptric projectors are illustrated in accordance with various embodiments. Three catadioptric projectors 300, 301, and 302 are illustrated, each of which may be an example of the catadioptric projector 101 shown in FIG. 1 and/or catadioptric projector 200 of FIG. 2A. Catadioptric projector 300 may include a radiation source 303. In this case, the radiation source 303 may be a single-mode laser diode, though other radiation sources may be used. The output of the radiation source 303 may be collimated using a lens 304. The collimated radiation may then be incident upon a static pattern generating element 305. In the illustrated embodiment, the static pattern generating element 305 may be a transmissive diffractive optical element that may produce a radiation pattern in the far field. The propagating radiation may be illustrated as a bundle of rays 306. The radiation may then be reflected by a reflector 307. The reflector 307 may be flat or it may be curved. If it is curved, it may be concave or convex. In some embodiments, the reflector 307 may be a convex hyperboloid, and the diffractive optical element 305 may be placed at a focus of the hyperboloid. The shape of the reflector 307 may be defined as a portion of a surface of rotation about an axis 308. The catadioptric projector 300 may have a primary optical axis 309, which may be defined by the elements of the optical system that precede the reflector 307. The reflector 307 may distribute the radiation pattern throughout a field of view 310. The field of view 310 may span an elevation angle, which may be illustrated by the spreading of the bundle of rays 306 within the plane of the diagram. The field of view 310 may also span an azimuthal angle, which may be represented by an angle of rotation out of the plane of the page about an axis. In some embodiments, the azimuthal field of view may be defined by a rotation about an axis of rotational symmetry 308 of the reflector 307.

The diagram of a catadioptric projector 301 further illustrates features that may exist according to various embodiments. Catadioptric projector 301 may include a radiation source 311. In this case, the radiation source 311 may be a VCSEL array, though other radiation sources may be used. The output of the radiation source 311 may be incident upon a static pattern generating element 312. In the illustrated embodiment, the static pattern generating element 312 may be a binary amplitude mask such as a chrome-on-glass mask, for example. The mask pattern may be imaged by a lens 313 to produce patterned illumination. The propagating patterned illumination may be illustrated as a bundle of rays 314. The radiation may then be reflected by a reflector 316. The catadioptric projector 301 may have a primary optical axis 315, which may be defined by the elements of the optical system that precede the reflector 316. The reflector 316 may have an axis of rotational symmetry that may coincide with the primary optical axis 315. The reflector 316 may distribute the radiation pattern throughout a field of view 317. The field of view 317 may span an elevation angle, which may be illustrated by the spreading of the bundle of rays 314 within the plane of the diagram. The field of view 317 may also span an azimuthal angle of 360 degrees about an axis, which may be coincident with the primary optical axis 315.

The catadioptric projector 302 may further illustrate aspects of various embodiments. Catadioptric projector 302 may include a radiation source 318. In this case, the radiation source 318 may be an LED, though other radiation sources may be used. The radiation source 318 may be located behind or inside a convex reflector 319. The output of the radiation source 318 may be collected using a condenser lens 320. The radiation may then be directed out through a hole or aperture 324 in the convex reflector 319, and towards a reconfigurable pattern generating element 321. In the illustrated embodiment, the reconfigurable pattern generating element 321 may be a liquid crystal on silicon (LCOS) display chip, for example. Alternatively, the reconfigurable pattern generating element 321 may be a digital micromirror device (DMD) or a liquid crystal display (LCD). The patterned radiation reflected by the reconfigurable pattern generating element 321 may be illustrated as a bundle of rays 322. The radiation may then be reflected by the reflector 319. The reflector 319 may distribute the radiation pattern throughout a field of view 323.

Figure 4:
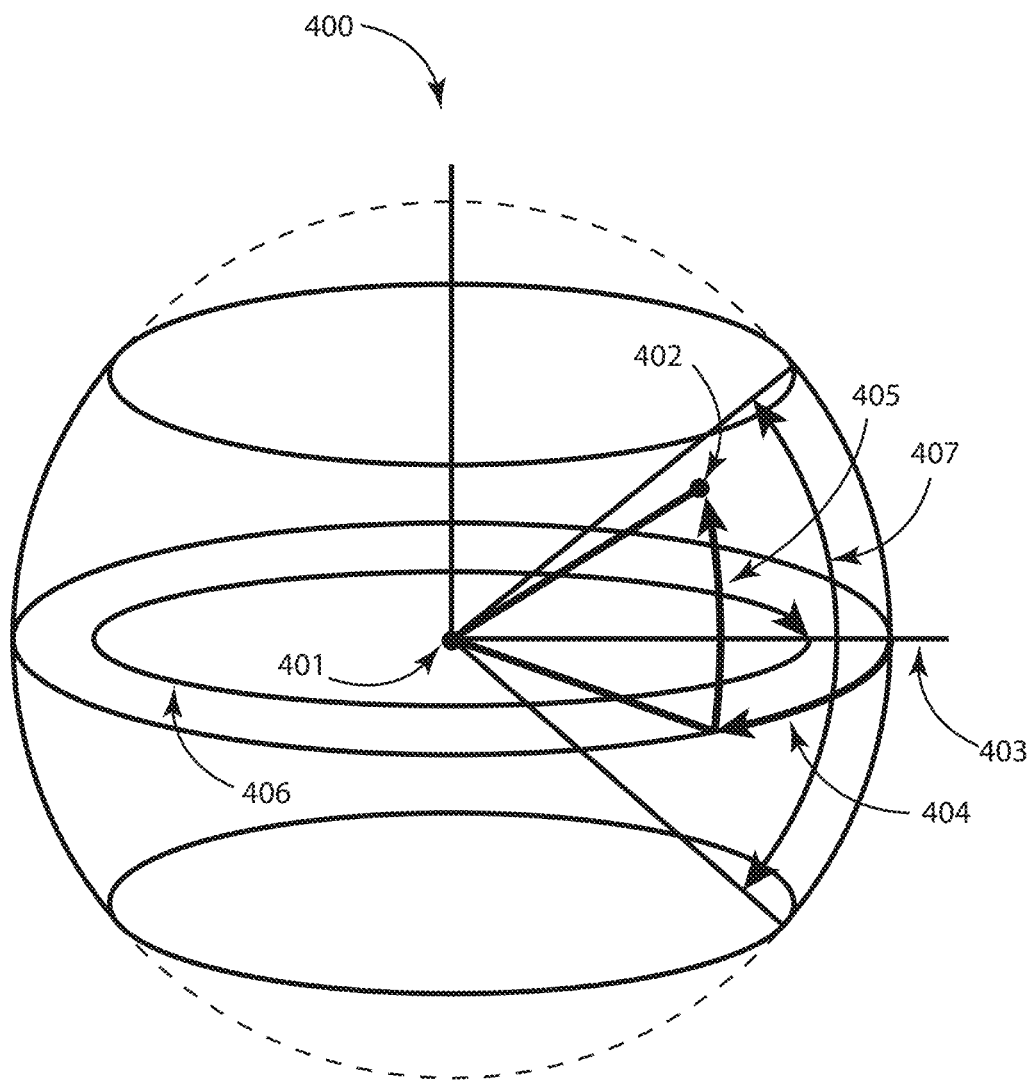
FIG. 4 shows a spherical coordinate system in accordance with various embodiments.

FIG. 4 illustrates a spherical coordinate system 400 that may aid in the description of various embodiments. The coordinate system may include an origin 401. In some embodiments, the origin may lie at a nominal location of a system for estimating the location of a point 402 on an object within a scene. In some cases, the origin may correspond to a characteristic point of the shape of a convex reflector. For example, the origin may correspond to a focus of a hyperboloid. A system located at or near the origin of the coordinate system may have a nominal optical axis 403. The location of the point 402 within the field of view of the system may be indicated by two angles: an azimuthal angle 404 and an elevation angle 405. Similarly, the extent of the field of view may be indicated by the minimum and maximum azimuthal angle and the minimum and maximum elevation angle that may be viewed by the system. The azimuthal field of view 406 may be determined by the minimum and maximum azimuthal angles. The vertical field of view 407 may be determined by the minimum and maximum elevation angles. Omnidirectional system embodiments may have an azimuthal field of view that covers the range of azimuthal angles from 0 degrees to 360 degrees. Some embodiments may have azimuthal fields of view of less than 360 degrees.

Figure 5:
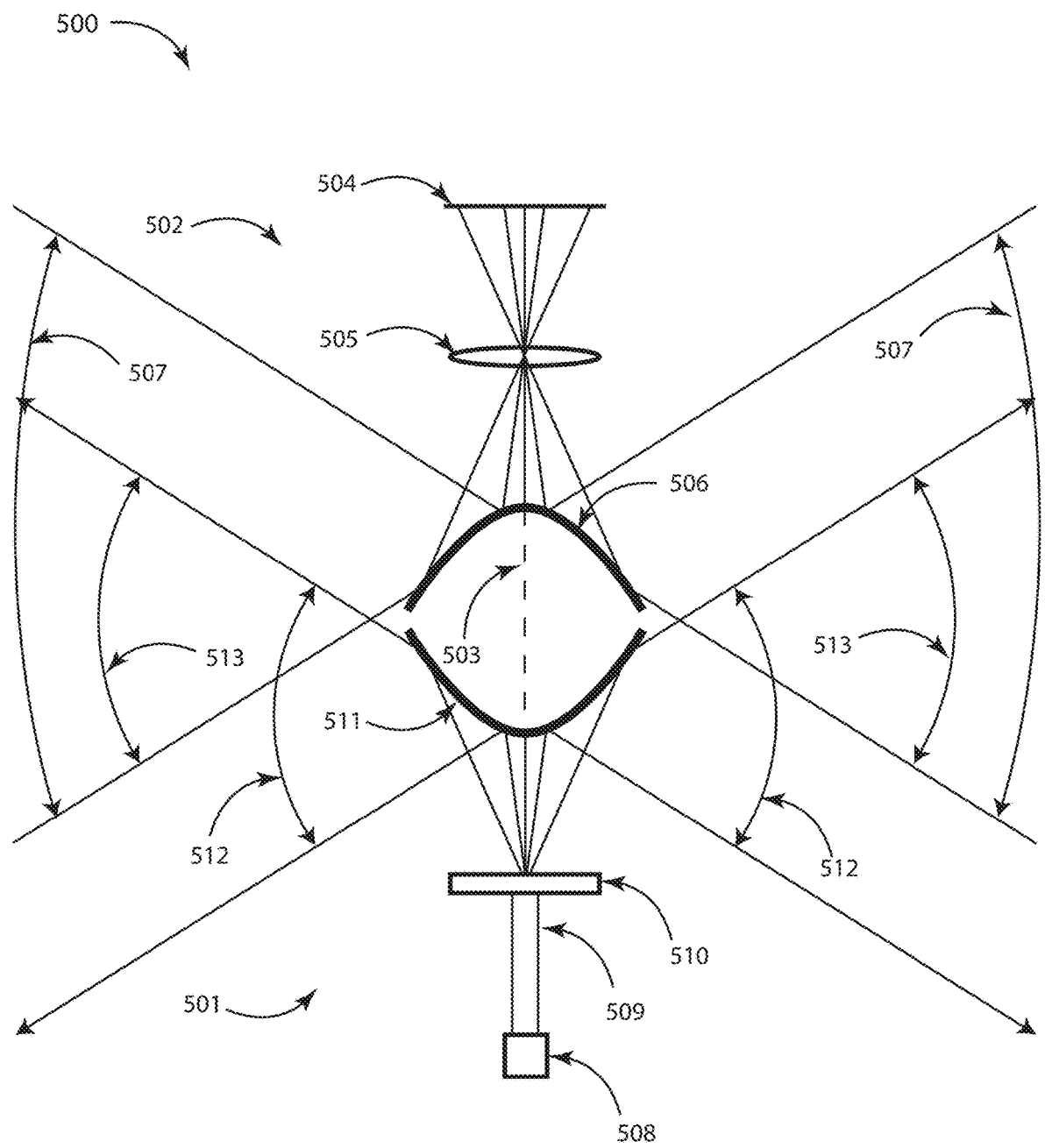
FIG. 5 shows a system in accordance with various embodiments.

FIG. 5 depicts a system 500 in accordance with various embodiments. The system 500 may include a catadioptric projector 501 and a camera 502. System 500 may be an example of system 100 of FIG. 1. The catadioptric projector 501 may be an example of the catadioptric projector 101 of FIG. 1A, the catadioptric projector 200 of FIG. 2A, and/or the catadioptric projector 200-a of FIG. 2B, for example. The camera 502 may or may not be catadioptric. The projector 501 and camera 502 may each have a primary optical axis 503, and the primary optical axes of the projector and camera may be substantially collinear.

System 500 may depict an omnidirectional depth sensing system. The camera 502 may be a catadioptric camera. The camera 502 and projector 501 may be aligned along a common primary optical axis 503. The camera 502 may include an image sensor 504, a refractive lens 505, and/or a reflecting surface 506. The reflecting surface 506 may be rotationally symmetric about the camera primary optical axis 503. This may cause the azimuthal field of view of the camera to span 360 degrees about the optical axis 503, for example. The camera field of view 507 parallel to the primary optical axis 503 may be less than 360 degrees in some cases. The result may be a camera capable of acquiring full 360 degree panoramic images. The catadioptric projector 501 may include a radiation source 508. Examples of radiation sources 508 that may be used in various embodiments include, but are not limited to, lamps, light emitting diodes, laser diodes, arrays of vertical-cavity surface-emitting lasers, and/or other light sources. Light 509 emitted by the radiation source 508 may be directed at a pattern generating element 510, which may be an example of the static pattern generating element 202 of FIG. 2A, for example. The pattern generating element 510 may generally cause a diverging illumination pattern to be projected along the primary optical axis 503. Examples of pattern generating elements 510 may include, but are not limited to, a photographic slide, a photomask, a diffractive optical element, a holographic optical element, a liquid crystal display panel, a digital micromirror array, and/or other pattern generating elements. The pattern generating element 510 may include a single component or multiple components, such as a photomask and/or a projection lens, for example. The catadioptric projector 501 may also include a reflecting surface 511 in some cases. The reflecting surface 511 may be rotationally symmetric about the projector primary optical axis 503, for example. This may generally cause the field of view of the projector 501 to span 360 degrees about the projector primary optical axis 503. The projector field of view 512 parallel to the primary optical axis 503 may be less than 360 degrees in some cases. The field of view 507 of the camera 502 and the field of view 512 of the projector 501 may be configured to overlap producing a system field of view 513.

The system 500 shown in FIG. 5 may be used for estimating the distance to a point on an object in a scene, for example. It will be appreciated by those skilled in the art that a system for estimating the distance to a point on an object in a scene, such as the system depicted in FIG. 5, may simultaneously or sequentially estimate the distance to multiple points on an object or objects in a scene. Furthermore, an estimate of distance to a point via triangulation may also enable the estimation of the three dimensional coordinates of the point. Multiple distance estimations (or coordinate estimations) may be used to produce a depth map, a point cloud, a mesh, or other data set.

Figure 6:
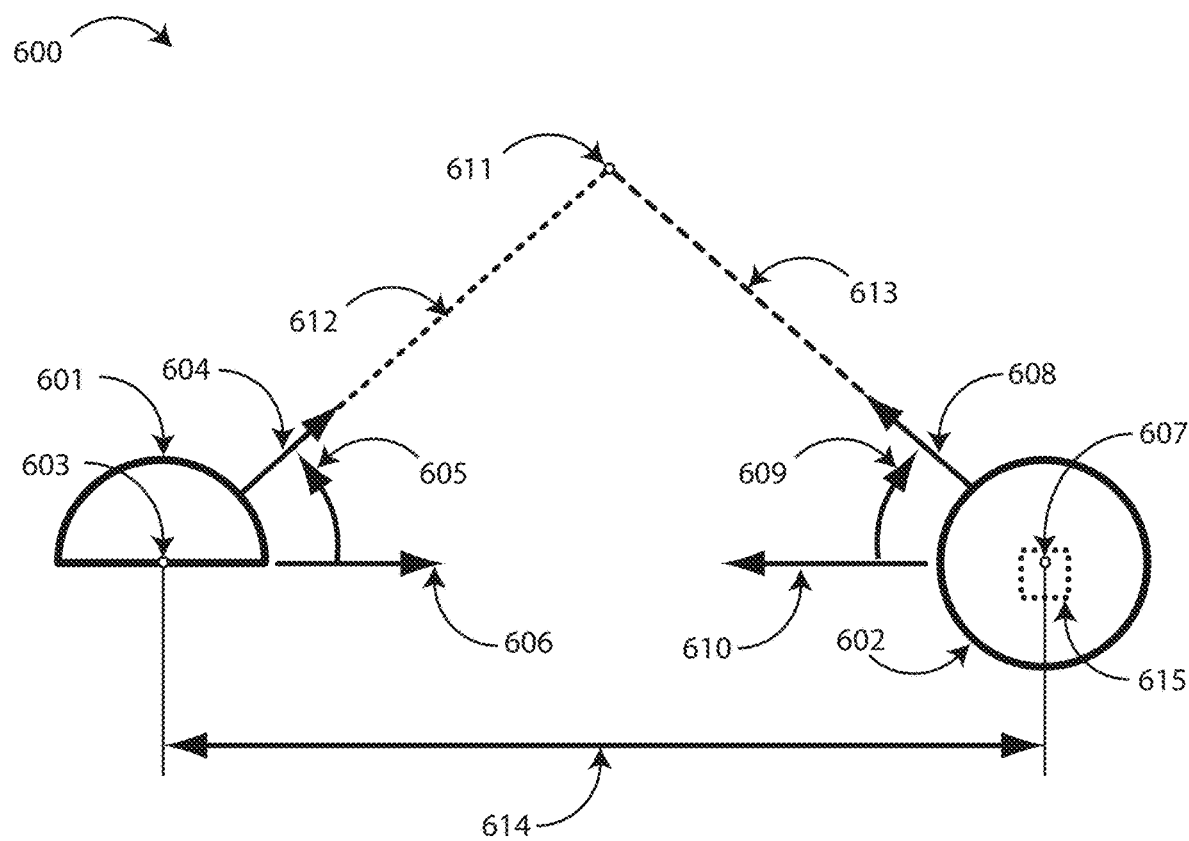
FIG. 6 shows a system in accordance with various embodiments.

FIG. 6 depicts a 3D catadioptric system 600 in accordance with various embodiments. System 600 may be an example of system 100 of FIG. 1. In system 600, the conic axes 607 of a catadioptric camera 602 and the conic axis 603 of a catadioptric projector 601 may deviate substantially from a collinear configuration. Catadioptric camera 602 may be an example of camera 102 of FIG. 1; catadioptric projector 601 may be an example of catadioptric projector 101 of FIG. 1, catadioptric projector 200 of FIG. 2A, and/or catadioptric projector 200-a of FIG. 2B.

The conic of the catadioptric projector 601 may have a projector conic axis 603, about which there may exist a cylindrical coordinate system that may include a projector radial distance 604 and an projector azimuth angle 605 measured with respect to a projector reference 606. This example may further include the conic of the catadioptric camera 602. In some embodiments, the conic of a catadioptric camera 602 and the camera conic axis 607 may be configured such that there may exist a cylindrical coordinate system that may include a camera radial distance 608 and an camera azimuth angle 609 measured with respect to a camera reference 610. The projector conic axis 603 and the camera conic axis 607 may be parallel and offset from each other by a substantially known baseline 614. In some embodiments, the 3D position of a position 611 may be calculated from the projector azimuth angle 605, the camera azimuth angle 613, the baseline 614, and/or at least one of: the projector elevation angle or the camera elevation angles, which extend out of the page in FIG. 6.

In some embodiments, the conic of the catadioptric projector 601 may be built in various shapes. As depicted in FIG. 6, the conic of the catadioptric project 601 may be illustrated as a semi-circle to depict a reflection surface which covers a 180-degree projector azimuth field of view (FOV). This may contrast the conic of the catadioptric camera 602 may be illustrated as a circle to depict a reflection surface which covers a 360-degree projector azimuth FOV. In some embodiments, variations in the conic shape may also apply to the conic of the catadioptric camera 602.

In some embodiments, the placement 615 of an image sensor in the catadioptric camera 602 is shown with a substantial offset with respect to the camera conic axis 607. Such placement may provide higher resolution over a smaller FOV, and may be useful in embodiments where the projector FOV may be similarly restricted. In some embodiments, the placement may also include shifts along the direction of the baseline.

In some embodiments, one may use a geometry in which the conic axis 603 of the catadioptric projector 601 is directed substantially parallel to the baseline 614 and the conic axis 607 of the catadioptric camera 602 is substantially orthogonal to the baseline 614. In such an embodiment, the position 611 may be calculated from the projector elevation angle, the camera azimuth angle 613, the baseline 614, and/or at least one of: the projector azimuth angle or the camera elevation angle.

In some embodiments, the conic axis 603 of the catadioptric projector 601 may be directed elsewhere in the plane defined by the conic axis 607 of the catadioptric camera 602 and the baseline 614. In some embodiments, the conic axis 603 of the catadioptric projector 601 may be aligned in an arbitrary direction.

Figure 7:
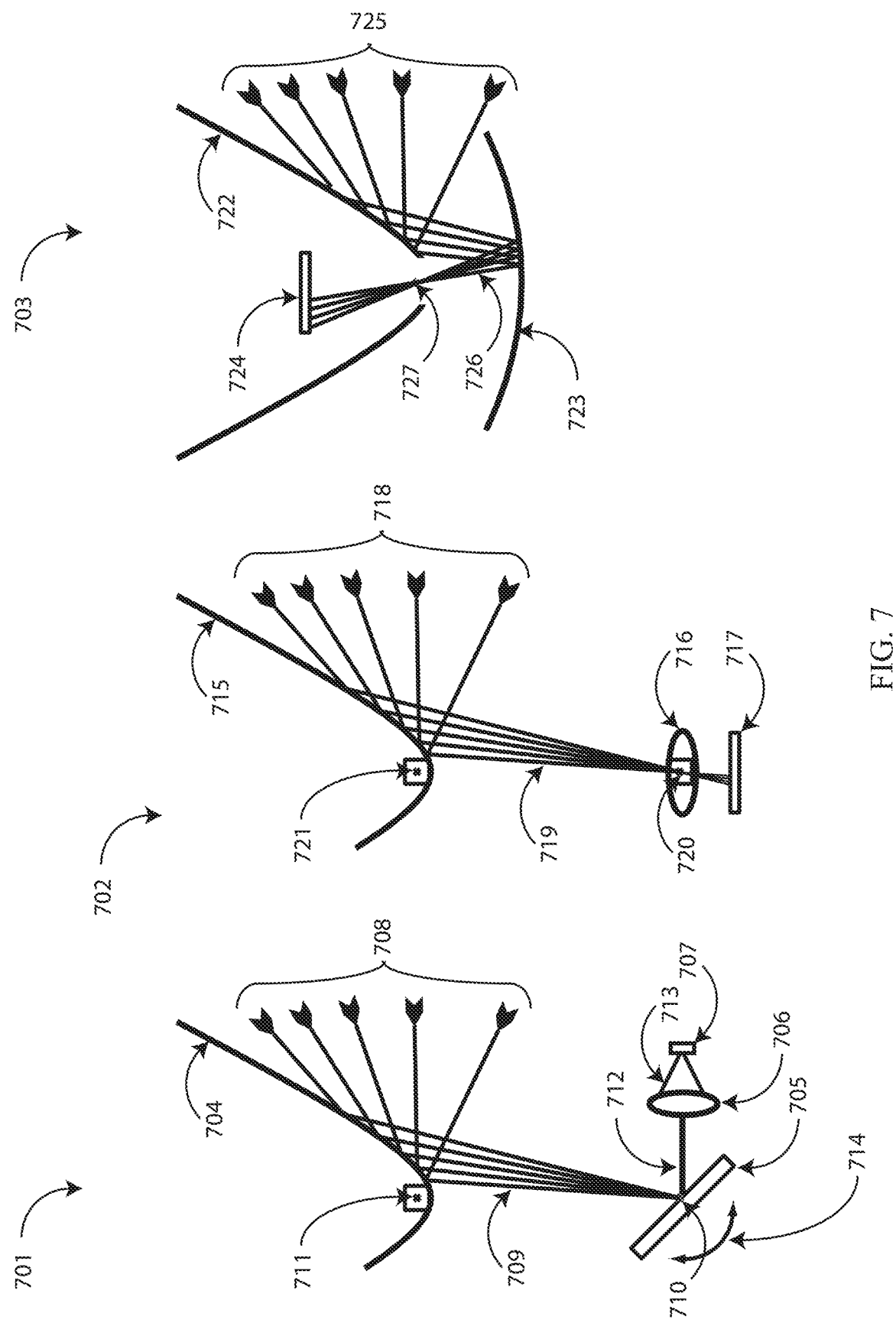
FIG. 7 shows catadioptric cameras in accordance with various embodiments.

FIG. 7 depicts various catadioptric cameras 701, 702, and 703 in accordance with various embodiments. In some embodiments, catadioptric cameras 701, 702, or 703 may be combined with catadioptric projectors 300, 301, or 302 in FIG. 3 in various configurations to build 3D catadioptric systems such as systems 500 or 600, for example. Some embodiments may be used by various methods including method 1000 of FIG. 10A, method 1000-a of FIG. 10B, or method 1100 of FIG. 11 to estimate 3D positions. Some embodiments may be used in conjunction with other projector types, within other systems, and using other methods. Catadioptric cameras 701, 702, and 703 may be examples of camera 102 of FIG. 1.

Catadioptric camera 701 may be an example of a scanning catadioptric camera. Catadioptric camera 701 may include a convex reflector 704, a reflecting element 705, a focusing element 706, and/or one or more detector elements 707. In some embodiments, rays 708 from a scene may impinge on the convex reflector 704 where they may converge 709 substantially to one or more foci 710 and/or 711. Reflecting element 705 may be positioned such that one or more rays 712 may be reflected into focusing element 706, which may cause the light to focus 713 onto the one or more detector elements 707. Various configurations may be implemented in accordance with various embodiments. In some embodiments of catadioptric camera 701, the convex reflector 704 may be generally classified as a hyperboloid. In some embodiments of catadioptric camera 701, the convex reflector 704 may be generally classified as a sphere, a paraboloid, a toroid, or a pyramid. In some embodiments of catadioptric camera 701, the reflecting element 705 may be a scanned mirror where the mirror may be tilted 710 substantially about a fixed axis 710 such that one or more rays from the scene 708 may be selected to produce the one or more rays 712 into the focusing element 706. In some embodiments of catadioptric camera 701, the reflecting element 705 and the focusing element 706 may be substantially combined into a single element. In some embodiments of catadioptric camera 701, the detector element 707 may be a single photodiode. In some embodiments of catadioptric camera 701, the detector element 707 may be a CMOS image sensor array, a CCD images sensor array, or an array of photodiodes.

Catadioptric camera 702 may be an example of a lens-based catadioptric camera. Catadioptric camera 702 may include a convex reflector 715, an imaging lens 716, and/or an image sensor 717. In some embodiments, rays 718 from a scene may impinge on the convex reflector 715 where they may converge 719 substantially to one or more foci 720 and/or 721 and may pass through the imaging lens 716 such that an image may be formed on the image sensor 717. In some embodiments of catadioptric camera 702, the imaging lens 716 may be a sub-assembly combining two or more lenses. In some embodiments of catadioptric camera 702, the imaging lens 716 may include a spectral filter, the imaging lens 716 may include a turning mirror, the imaging lens 716 may be placed such that the principle plane of the lens may be substantially aligned to one or more foci 720 and/or 721, the imaging lens 716 may be placed such that the lens axes may be substantially aligned to the conic axis, and/or the imaging lens 716 may be substantially tilted. In some embodiments of catadioptric camera 702, the image sensor 717 may include a CMOS image sensor array, the image sensor 717 may include a spectral filter, the image sensor 717 may include a color image sensor, and/or the image sensor 717 may include pixels devoted to red, green, blue, and infrared wavelengths of light.

Catadioptric camera 703 may provide an example of a mirror-based catadioptric camera. Catadioptric camera 703 may include a convex reflector 722, an imaging reflector element 723, and/or an image sensor 724. In some embodiments, rays 725 from a scene may impinge on the convex reflector 722 and/or the imaging reflector element 723 such that they converge 726 substantially to one or more foci 727 and form an image on the image sensor 724. In some embodiments of mirror-based catadioptric camera 703, the imaging reflector element 723 may be parabolic, spherical, elliptical, or hyperbolic.

In some embodiments of the catadioptric camera 701, 702, or 703, the system may be reconfigured to restrict or expand the field of view (FOV). In some embodiments, the tilting 714 of a scanned mirror may be dynamically controlled to restrict or expand the FOV. In some embodiments, the optical axis of an imaging lens 716 may be tilted to capture off-axis rays from the convex reflector 715. In some embodiments, the position of an image sensor 717 may be shifted in order to sample an off-axis set of rays from the convex reflector 715.

One may recognize that alternative embodiments of the catadioptric camera may include combinations of elements incorporated into the scanning catadioptric camera embodiment 701, the lens-based catadioptric camera embodiment 702, and/or the mirror-based catadioptric camera embodiment 703. For example, in some embodiments, the scanning 714 may be applied to a imaging reflector element 723. In another example, the imaging lens 716 may include both a lens and an imaging reflector element 723.

Figure 8:
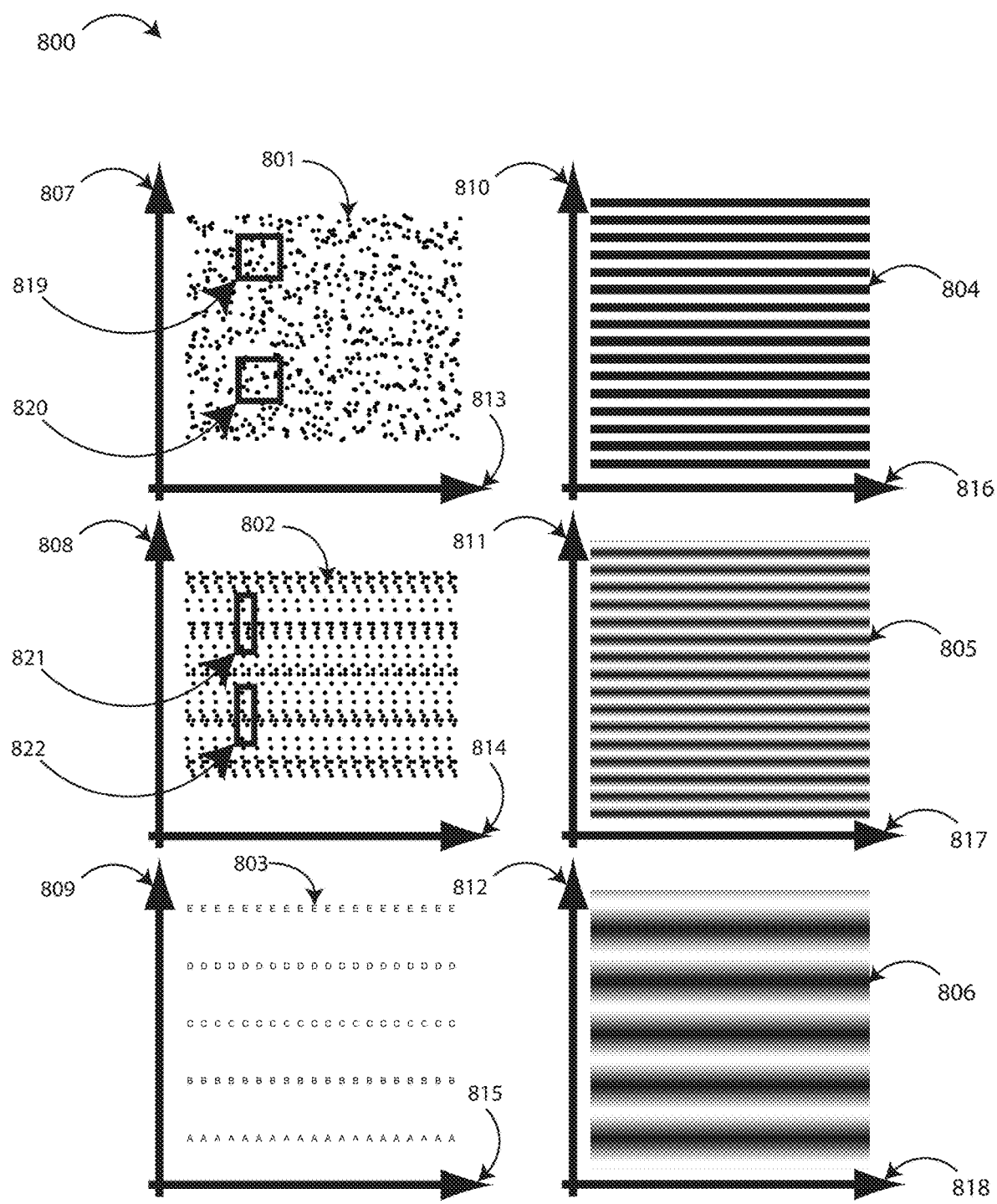
FIG. 8 shows a collection of pattern configurations in accordance with various embodiments.

FIG. 8 depicts a collection 800 of projected pattern configurations in accordance with various embodiments. The specific examples of projected pattern 801, 802, 803, 804, 805, and 806, are generally illustrated as patterns varying along two dimensions. For the purpose of clarity, these patterns have been drawn such that the pattern variation falls along at least one dimension, illustrated for the collection 800 of projected patterns as the first dimension 807, 808, 809, 810, 811, and 812. In patterns 804, 805, and 806, the pattern may remain constant across the second dimension 816, 817, and 818, respectively. In patterns 802 and 803, the pattern may vary and repeat across the second dimension 814 and 815, respectively. In pattern 801, the pattern may vary without repeating.

In some embodiments of measurement systems, including but not limited to the catadioptric systems 100, 500 and/or 600, the direction of pattern variation may enable measurement along the direction.

Figure 10A:
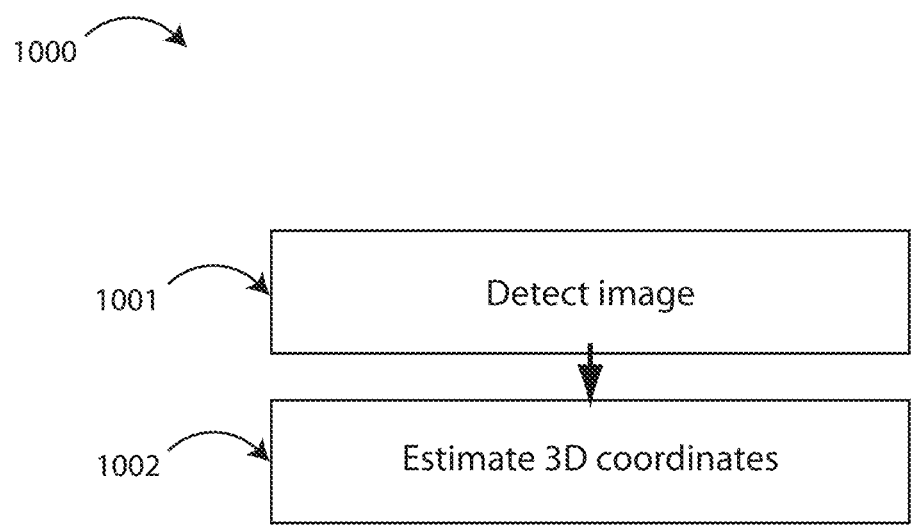
FIG. 10A shows a flow diagram of a method in accordance with various embodiments.
Figure 10B:
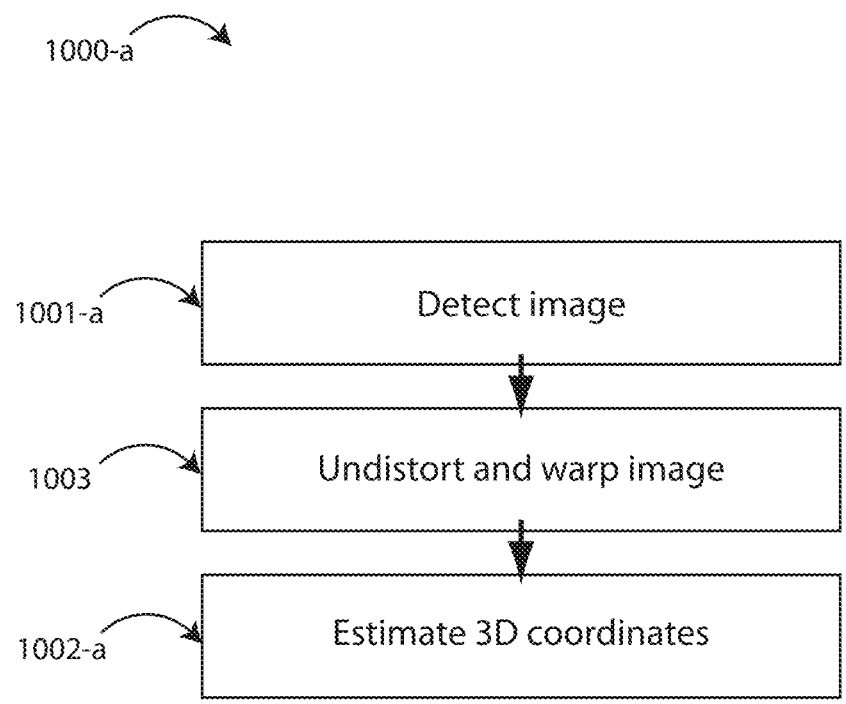
FIG. 10B shows a flow diagram of a method in accordance with various embodiments.
Figure 11:
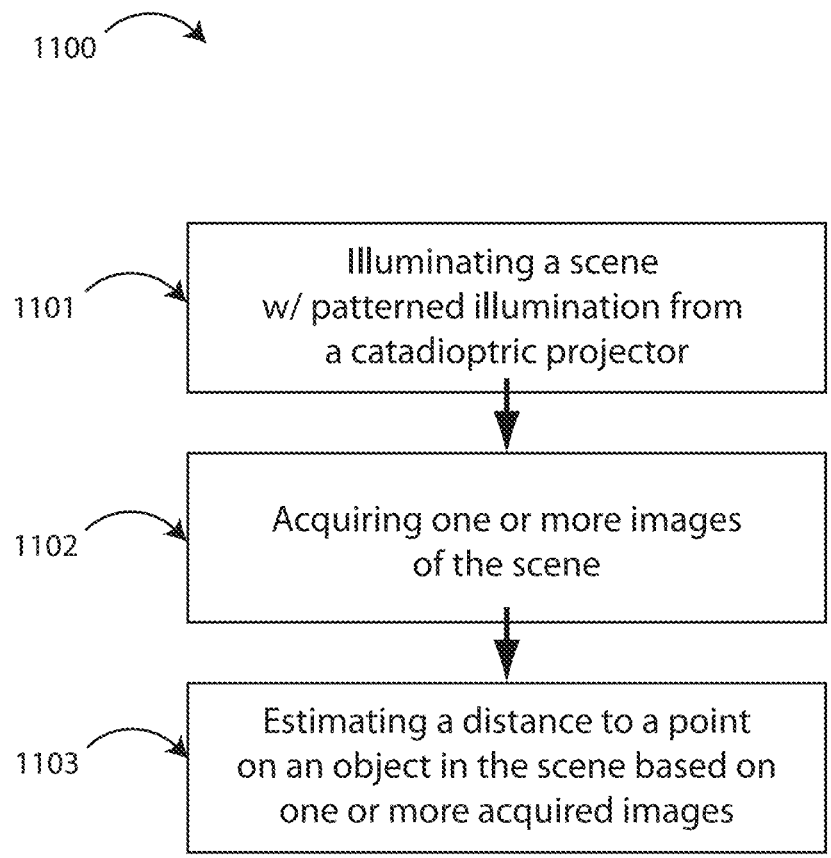
FIG. 11 shows a flow diagram of a method in accordance with various embodiments.

Some catadioptric systems, such as systems 100 and/or 500, may be integrated with a method for the estimation of a 3D position (such as method 1000 of FIG. 10A, method 1000-a of FIG. 10B, and/or method 1100 of FIG. 11, for example). Such methods may include a triangulation method based on the projector elevation angle and may be integrated with one or more projected patterns. In some 3D catadioptric system in accordance with various embodiments, the projected pattern may be aligned such that the pattern variation along the first dimension 807, 808, 809, 810, 811, and/or 812 may be substantially aligned with the elevation angle. This pattern alignment may enable measurement along the first dimension 807, 808, 809, 810, 811, and/or 812, which may correspond to a measurement along the elevation angle and thereby may enable the estimation of a 3D position.

Some catadioptric systems, such as system 100 of FIG. 1 and/or system 600 of FIG. 6, may be integrated with a method for the estimation of a 3D position (such as methods 1000 of FIG. 10A, method 1000-a of FIG. 10B, and/or method 1100 of FIG. 11, for example). Such methods may include a triangulation method based on the projector azimuth angle and may be integrated with one or more projected patterns. In some 3D catadioptric system in accordance with various embodiments, the projected pattern may be aligned such that the pattern variation along the first dimension 807, 808, 809, 810, 811, and/or 812 may be substantially aligned with the azimuth angle. This pattern alignment may enable measurement along the first dimension 807, 808, 809, 810, 811, and/or 812, which may correspond to a measurement along the azimuth angle and thereby enables the estimation of a 3D position.

Some embodiments of the projected pattern may be a random pattern 801, which may be illustrated here as a pattern varying along two dimensions 807 and 813. Within the random pattern 801, a window of a certain size 819 may be distinct from a second window of a certain size 820. In some embodiments, portions of the random pattern may repeat. In some embodiments of the random pattern 801, the pattern may be random in one dimension 807 and may repeat along a second dimension 813. In some embodiments of the random pattern 801, the pattern may be random in one dimension 807 and may be continuous along a second dimension 813.

Some embodiments of the projected pattern may be a set of two dimensional symbols 803, which may be illustrated here as a pattern varying along two dimensions 809 and 815. Within the symbol pattern, symbols show here as the letters 'A' through 'E' may vary along the first dimension 809 and may repeat along the second dimension 815. In some embodiments of a two dimensional symbol pattern 803, the letters 'A' may be replaced by unique two dimensional symbols. An example of a two dimensional symbol pattern may be illustrated in the pattern 802, where the two dimensional patch of dots such as 821 and 822 may vary along the first dimension 808 such that each patch is distinct from the next along the first dimension 808 and repeats along the second dimension 814. In some embodiments, the two dimensional symbols may vary along the second dimension 815. In some embodiments, the two dimensional symbol may repeat one or more symbols along two or more dimensions.

Some embodiments of the projected pattern may be a set of stripes 804, which may be illustrated varying along the first dimension 810 without varying along the second dimension 816. Other embodiments may include a two dimensional grid of dots.

Some embodiments of the projected pattern may be a high frequency one dimensional fringe pattern 805, which may vary along the first dimension 811 and may be constant along the second dimension 817. Some embodiments of the projected pattern may be a low frequency one dimensional fringe pattern 806, which may vary along the first dimension 812 and may be constant along the second dimension 818.

In some embodiments, one or more patterns 800 may be used. In some embodiments, a superposition of two or more patterns 800 may be used in a static projector system. In some embodiments, a sequence of two or more pattern embodiments 800 may be projected in time. In some embodiments, a sequence of fringe patterns 805 and 806 varying in phase and or frequency may be projected in time. In some embodiments, a sequence of symbolic light patterns 802 and 803 may be projected in sequence of a sequence of fringe patterns 805 and 806.

Figure 9:
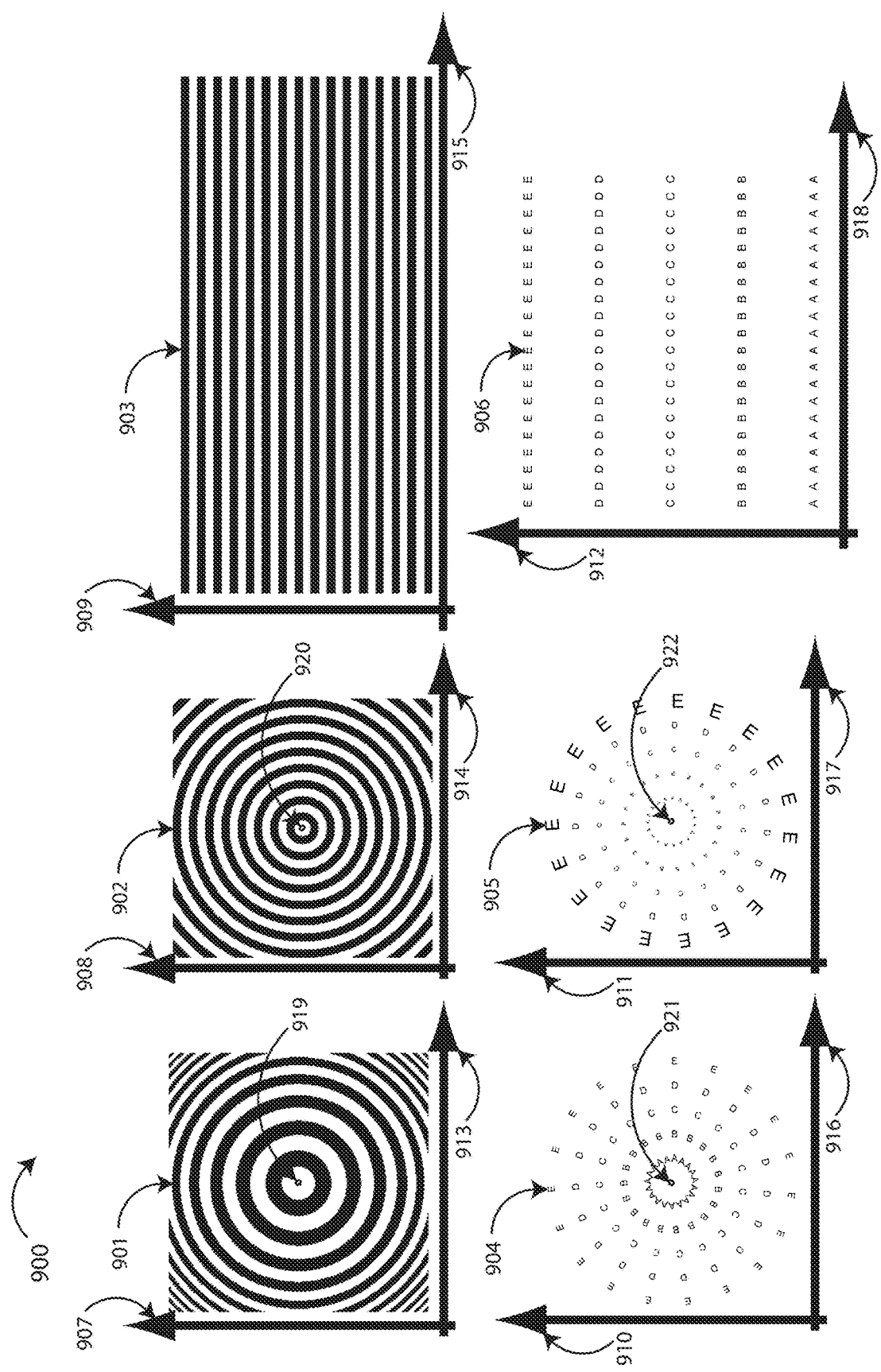
FIG. 9 shows a collection of pattern configurations in accordance with various embodiments.

Moving from the collection 800 of pattern configurations illustrated in FIG. 8, FIG. 9 depicts a collection 900 of pattern configurations in accordance with various embodiments. Whereas the illustrated coordinates in FIG. 8's collection 800 of pattern configurations may be drawn in a rectilinear coordinate system, pattern configurations 901, 902, 904, and 905 may include patterns that may vary radially about a central point 919, 920, 921, and 922, respectively. Some embodiments may include pattern variations with angle, pattern variations in three dimensions, and/or pattern variations about parametric curves.

Pattern configurations 901 and 902 may remain constant with the angle about the central point 919 and 920, respectively. The two dimensional symbol pattern configurations 904 and 905 may vary and repeat with angle about the central point 921 and 922, respectively. In some embodiments, the symbol orientation may vary with angle about the central point 921 or 922.

Two example pattern configurations 902 and 904 may exhibit substantially uniform pattern scale with radial distance from the center point 920 and 921, respectively.

Some embodiments of pattern configuration 901 may exhibit a pattern scale which decreases with radial distance from the center point 919. Some embodiment of pattern configuration 905 may exhibit a pattern scale which increases with radial distance from the center point 922.

The collection 900 of pattern configurations may further be combined with different catadioptric devices and/or systems, such as the catadioptric system 100 of FIG. 1 and/or system 500 of FIG. 5, where the conic axes may be substantially colinear. In some embodiments, pattern configurations 901, 902, and/or 903 are various configurations of the line pattern 804 in FIG. 8. For example, the radial pattern 901 may depict the projected pattern, the axes 907 and 913 may depict spatial coordinates of the mask in a catadioptric projector, such as the catadioptric projector 301 of FIG. 3, and the center point 919 is the intersection of the projector conic axis with the mask. In some embodiments of a 3D catadioptric system, the radial pattern 902 may depict the detected image on an image sensor of a catadioptric camera 701, 702, or 703 of FIG. 7, the axes 908 and 914 may depict spatial coordinates of the image sensor, and the center point 920 may depict the intersection of the camera conic axis with the image sensor. In such a system, the decrease in pattern scale with radial distance exhibited by projected pattern 901 may produce a substantially uniform pattern scale for a range of object depths. In some embodiments in which the image sensor has uniform pixel spacing, such a pattern configuration may substantially increase the fringe density throughout the FOV. Because precision in fringe projectors may be enhanced with increased fringe density, some embodiment may enhance the precision. In some embodiments, the projected pattern may be considered to encode the elevation angle along the radial dimension of the pattern. In some embodiments, the image sensor pattern 902 may be warped to produce a pattern substantially similar to 903, where axis 909 may represent a function of the camera elevation angle and axis 915 may represent a function of the camera azimuth angle.

Combining the one or more of the pattern configurations from the collection 900 with the 3D catadioptric system 500 of FIG. 5 is merely an example embodiment of the pattern configurations. In some embodiments, the single pattern configuration set 901, 902, and/or 903 based on pattern type 804 may be replaced by a multiple pattern configuration sets based on a multiple pattern type including, but not limited to, 805 and 806.

One skilled in the art may also recognize that various embodiments of the 3D catadioptric systems may be combined with other variations of pattern configurations. In some embodiments, for example, the projected pattern may be depicted with uniform pattern scaling such as 902 and the pattern on the detected image may be depicted with varying pattern scaling such as 901. In some embodiments of the pattern configuration, the pattern scaling of either the projector or the camera may increase with radial distance. In some embodiments of the pattern configuration, the direction of pattern variation of the pattern types 800 may vary with the angle about the center point.

In some embodiments, the pattern configurations 901, 902, and/or 903 may be replaced by a pattern configuration set based on a two dimensional symbol pattern 809. In such an embodiment, the pattern configuration set may resemble 904, 905, and/or 906. In some embodiments, pattern configuration 904 may be considered the projected pattern (with axes 910 and 916), configuration 905 may be considered the detected image (with axes 911 and 917), and configuration 906 may be considered a warping of the detected image such that axis 912 represents a function of the camera elevation angle and axis 918 represents a function of the camera azimuth angle. The projector conic axis may be depicted as the center point 921 and the camera conic axis may be depicted as the center point 922. In some embodiments, the projector pattern 904 may maintain a uniform pattern scale throughout the pattern and may increase the density of the pattern near the center point 921. The detected image 905 may exhibit a pattern scale, which may increase with the radial distance from the camera conic axis 922. In some embodiments, the warping of the detected image may produce symbols, which may exhibit pattern scale changes that may be substantially small. In some embodiments, any symbol decoding methods with respect to 3D estimation methods may proceed without substantial methods to account for the symbol scale.

In some embodiments, methods to produce 3D measurements, such as method 1000 of FIG. 10A or method 1100 of FIG. 11, may not include the warping of the detected image. In some embodiments, 3D estimation methods may be performed directly on the detected image. In some embodiments combining such methods with pattern types 803, the projector may be configured such that the detected image may have a pattern configuration substantially similar to pattern configuration 906. In some embodiments, symbol decoding methods with respect to the 3D estimation methods such as method 1000-b of FIG. 10B may proceed without substantial methods to account for the symbol scale.

FIG. 10A illustrates a flow diagram of a method 1000 to produce 3D measurements in accordance with various embodiments. Method 1000 may be used in conjunction with devices, systems, and other methods described herein. For example, the method may be used in conjunction with system 100 of FIG. 1, projector 200 in FIG. 2A, projector 200-a of FIG. 2B, projector 300, 301, or 302 of FIG. 3, system 500 of FIG. 5, system 600 of FIG. 6 and/or camera 701, 702, or 703 in FIG. 7.

In method 1000, there may be two general blocks of operations: at block 1001, the method may detect an image; and at block 1002, the method may estimate a 3D location based on the image.

At block 1001, the image may be detected by the image sensor within a catadioptric camera, such as device 701, 702, or 703 of FIG. 7 for example, and the image may include the image of multiple amplitude modulations projected onto one or more objects. In some embodiments, the image may be detected by other camera devices including but not limited to a single digital SLR camera, an array of cameras, and/or an array of image sensors within a catadioptric camera device.

Block 1001 may include methods to configure or interface with the image sensor. As a result, block 1001 may include a wide range of methods used in digital image capture, including but not limited to: high dynamic range image capture, the removal of hot pixels, automatic exposure, etc. When the image sensor is built into a camera device such as device 701, 702, or 703 in FIG. 7 for example, the block of 1001 may include digital camera techniques including but not limited to autofocus, image sharpening, image contrast enhancement, or deconvolution. When the image sensor is built into a catadioptric device, such as 701, 702, or 703 in FIG. 7 for example, block 1001 may include methods used in digital catadioptric camera systems including the production of spherical panoramic images. Block 1001 may include any additional methods to capture the image including but not limited to the reformatting of the image, the extraction of the image from a movie, the extraction of the image from a more extensive set of data, the extraction of the image from a remote location, and/or the storage of an image.

Block 1001 may include methods to configure or interface with a catadioptric projector, such as device 200 of FIG. 2A for example. When a catadioptric projector device includes a reconfigurable pattern generating element, block 1001 may include communicating the patterns to the projector. Block 1001 may include methods to strobe or otherwise modulate the source of the projector device, such as source 201 of FIG. 2A for example, or methods to adjust the wavelength or spectrum of the device. Block 1001 may include methods to synchronize the projector, such as device 200 of FIG. 2A for example, with one or more camera devices, such as devices 701, 702, or 703 of FIG. 7 for example.

At block 1002, the method may estimate a 3D location. In some embodiments, this method operates directly on the output of the image sensor. Some embodiments may include image processing methods including dark image subtraction, bright field calibration, and/or image thresholding. In some embodiments, the estimation of 3D location 1002 may include methods which depend on the projected pattern.

In some embodiments where the projected pattern includes spatial symbols, the estimation of 3D locations at block 1002 may include locating the spatial symbols, identifying the spatial symbols, determining the projector azimuth and/or elevation angle corresponding to said identity, measuring the location of the spatial symbol in the image, and/or calculating the camera azimuth and/or elevation angles corresponding to the image location.

In some embodiments where the projected pattern may include temporally varying fringe patterns, the estimation of 3D locations at block 1002 may include calculating the fringe phase at each pixel of the image, calculating the projector azimuth and/or elevation angle corresponding to the phase, and/or determining the camera azimuth and/or elevation angle for each pixel.

Some embodiments of the estimation of 3D location at block 1002 include methods of triangulation. When such a method is coupled with a catadioptric system, such as system 100 of FIG. 1 or system 500 of FIG. 5, where the conic axes may be colinear, the estimation of 3D location at block 1002 may calculate the 3D location for each point on the object from the projector azimuth angle, the projector elevation angle, and/or the camera elevation angle. When such a method is coupled with a catadioptric system, such as system 100 of FIG. 1 or system 600 of FIG. 6, where the conic axes may be parallel and offset, the estimation of 3D location at block 1002 may calculate the 3D location for each point on the object from the projector azimuth angle, the projector elevation angle, and/or the camera azimuth angle.

FIG. 10B illustrates a flow diagram of a method 1000-a to produce 3D measurements in accordance with various embodiments. Method 1000-a may be an example of method 1000 of FIG. 10A. Method 1000-*a* may be used in conjunction with devices, systems, and other methods described herein. For example, the method may be used in conjunction with system 100 of FIG. 1, projector 200 in FIG. 2A, projector 200-*a* of FIG. 2B, projector 300, 301, or 302 of FIG. 3, system 500 of FIG. 5, system 600 of FIG. 6 and/or camera 701, 702, or 703 in FIG. 7.

In method 1000-*a*, there may be three general blocks of operations: at block 1001-*a*, the method may detect an image; at block 1003, the method may map the detected image onto a remapped image, and at block 1002-*a*, the method may estimate a 3D location based on the image.

At block 1001-*a*, the image may be detected by the image sensor within a catadioptric camera, such as camera 102 of FIG. 1 or device 701, 702, or 703 of FIG. 7, and the image may include the image of multiple amplitude modulations projected onto one or more objects.

In some embodiments, the image may be detected by other camera devices including but not limited to a single digital SLR camera, an array of cameras, and/or an array of image sensors within a catadioptric camera device.

Block 1001-*a* may include methods to configure or interface with the image sensor. As a result, the block 1001-*a* may include a wide range of methods used in digital image capture, including but not limited to: high dynamic range image capture, the removal of hot pixels, automatic exposure, etc. When the image sensor is built into a camera device, such as camera 701, 702, or 703 in FIG. 7 for example, block 1001-*a* may include digital camera techniques including but not limited to: autofocus, image sharpening, image contrast enhancement, and/or deconvolution. When the image sensor is built into a catadioptric device, such as camera 701, 702, or 703 in FIG. 7 for example, block 1001-*a* may include methods used in digital catadioptric camera systems including the production of spherical panoramic images. Block 1001-*a* may include any additional methods to capture the image including but not limited to: the reformatting of the image, the extraction of the image from a movie, the extraction of the image from a more extensive set of data, the extraction of the image from a remote location, or the storage of an image.

Block 1001-*a* may include methods to configure or interface with a catadioptric projector, such as projector 101 of FIG. 1, device 200 of FIG. 2A, and/or device 200-*a* of FIG. 2A. When a catadioptric projector device includes a reconfigurable pattern generating element, block 1001-*a* may include communicating the patterns to the projector. Block 1001-*a* may include methods to strobe or otherwise modulate a source, such as source 201 of FIG. 2 or source 201-*a* of FIG. 2A, of the projector device, or methods to adjust the wavelength or spectrum of device. Block 1001-*a* may include methods to synchronize the projector with one or more cameras, such as camera 102 of FIG. 1 or camera 701, 702, or 703 of FIG. 7.

At block 1003, the method may map the image from the image sensor onto a remapped image. Block 1003 may include distortion compensation to produce an image comparable to that of a pinhole camera. Block 1003 may include methods to warp the image from the catadioptric camera and produce a spherical panoramic image. Block 1003 may include both distortion compensation and warping.

At block 1002-*a*, the method may estimate a 3D location. In some embodiments, this method operates on the remapped image. Some embodiments may include image processing methods including dark image subtraction, bright field calibration, and/or image thresholding.

In some embodiments, the estimation of 3D location at block 1002-*a* may include methods that depend on the projected pattern. In some embodiments where the projected pattern may include spatial symbols, the estimation of 3D at block 1002-*a* may include locating the spatial symbols, identifying the spatial symbols, determining the projector azimuth and/or elevation angle corresponding to the identity, measuring the location of the spatial symbol in the image, and calculating the camera azimuth and/or elevation angles corresponding to the image location. In some embodiments where the projected pattern may include a random distribution, the estimation of 3D locations at block 1002-*a* may include matching one or more regions of one image to one or more regions of a second image, measuring the disparity between the regions, and/or calculating the 3D location based on the disparity measurement. In some embodiments where the projected pattern may include temporally varying fringe patterns, the estimation of 3D locations at block 1002-*a* may include calculating the fringe phase at each pixel of the image, calculating the projector azimuth and/or elevation angle corresponding to the phase, and/or determining the camera azimuth and/or elevation angle for each pixel.

Some embodiments of the estimation of 3D location at block 1002-*a* may include methods of triangulation. When such a method is coupled with a catadioptric system, such as system 100 of FIG. 1 or system 500 of FIG. 5, where the conic axes may be colinear, the estimation of 3D location at block 1002-*a* may calculate the 3D location for each point on the object from the projector azimuth angle, the projector elevation angle, and/or the camera elevation angle. When such a method is coupled with a catadioptric system, such as system 100 of FIG. 1 or system 600 of FIG. 6, where the conic axes may be parallel and offset, the estimation of 3D location at block 1002-*a* may calculate the 3D location for each point on the object from the projector azimuth angle, the projector elevation angle, and/or the camera azimuth angle.

FIG. 11 illustrates a flow diagram of a method 1100 in accordance with various embodiments. Method 1100 may be used in conjunction with devices, systems, and other methods described herein. For example, the method may be used in conjunction with system 100 of FIG. 1, projector 200 in FIG. 2A, projector 200-*a* of FIG. 2B, projector 300, 301, or 302 of FIG. 3, system 500 of FIG. 5, system 600 of FIG. 6, and/or camera 701, 702, or 703 in FIG. 7. Aspects of method 1000 of FIG. 10A and/or method 1000-*a* of FIG. 10B may be utilized with respect to method 1100.

At block 1101, a scene may be illuminated with patterned illumination using a catadioptric projector. In some embodiments, the catadioptric projector may utilize a static pattern generating element and/or time-varying pattern generating element to generate the patterned illumination. The static pattern generating element and/or time-varying pattern generating element may be integrated with a radiation source of the catadioptric projector or separate from the catadioptric projector. At block 1102, one or more images of the scene may be acquired. At block 1103, a distance to a point on an object in the scene may be estimated based on the one or more acquired images.

In some embodiments of method 1100, the patterned illumination includes at least an amplitude modulation in at least one spatial dimension, two spatial dimensions, or three spatial dimensions. The patterned illumination may include an arrangement of dots. The arrangement of dots may be uncorrelated.

In some embodiments of method 1100, the amplitude modulation may be configured to include multiple spatial symbols, where each spatial symbol may be distinguishable from the other spatial symbols of the multiple spatial symbols. Each respective spatial symbol of the multiple spatial symbols may be similar to a master spatial symbol such that a peak of a normalized spatial cross correlation of the master spatial symbol and each respective spatial symbol may exceed a threshold.

In some embodiments of method 1100, the patterned illumination is time-varying. The time-varying patterned illumination may include a sequence of illumination patterns with two or more of the sequence of illumination patterns varying sinusoidally along a spatial dimension and the two or more sinusoidally varying patterns having at least a different spatial frequency or a different phase. In some embodiments, the time-varying patterned illumination includes a sequence of illumination patterns with two or more of the sequence of illumination patterns including a stripe patterns and the two or more stripe patterns having at least a different spatial frequency or a different phase.

Some embodiments of method 1100 include comparing the one or more acquired images with one or more stored reference images. In some embodiments, the patterned illumination includes multiple spatial symbols, where each spatial symbol is distinguishable from the other spatial symbols of the multiple spatial symbols; estimating a distance to a point on an object in the scene based on the one or more acquired images may include identification of one or more spatial symbols of the multiple spatial symbols. Some embodiments may include comparing the one or more acquired images with one or more stored reference images.

Figure 12:
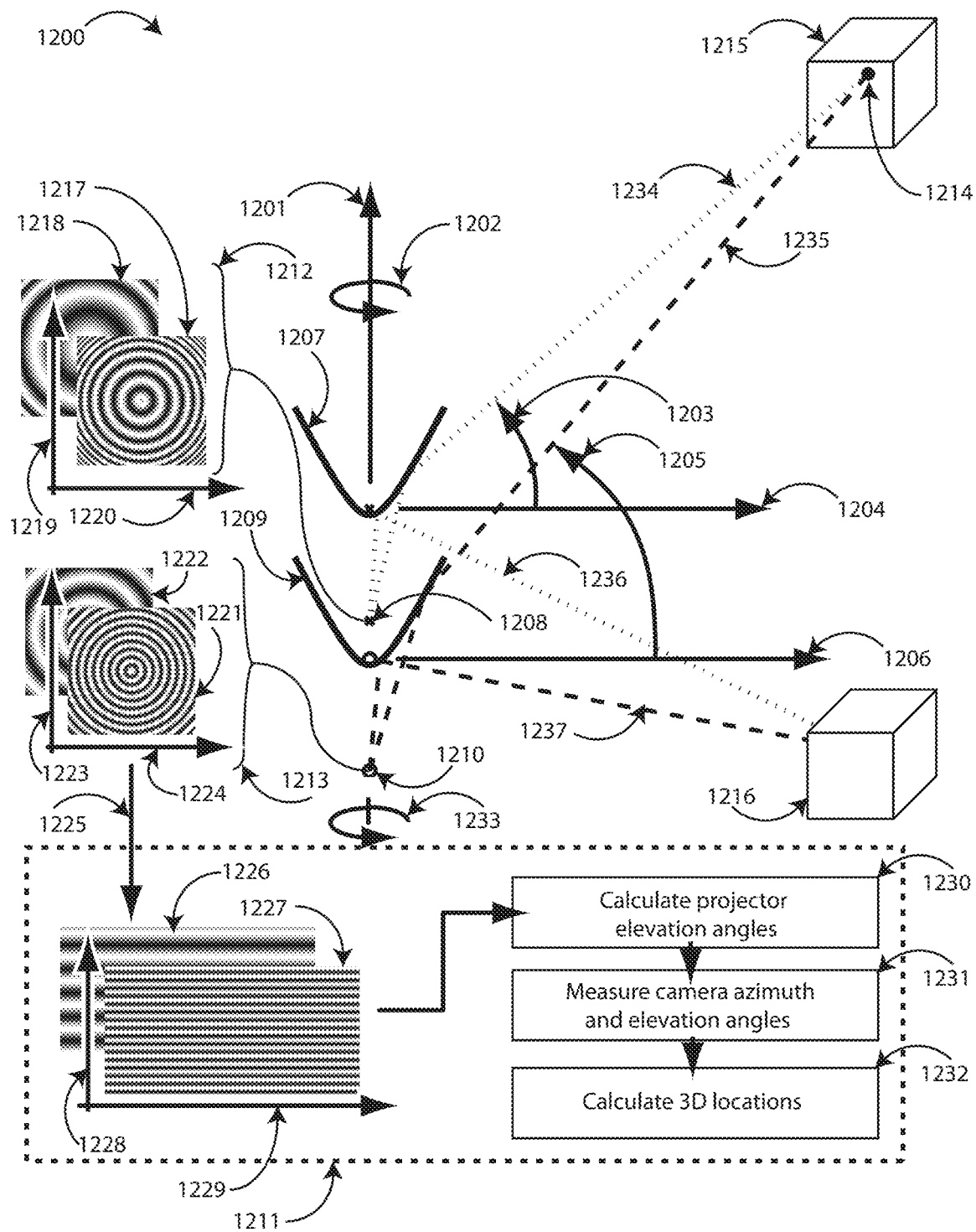
FIG. 12 shows a combination of systems and methods in accordance with various embodiments.

Turning now to FIG. 12, a combination of systems and methods 1200 that may produce one or more 3D measurements of a position is provided in accordance with various embodiments. The combination of systems and methods 1200 may be used in conjunction with aspects of system 100 of FIG. 1, projector 200 in FIG. 2A, projector 200-a of FIG. 2B, projector 300, 301, or 302 of FIG. 3, system 500 of FIG. 5, system 600 of FIG. 6, camera 701, 702, or 703 in FIG. 7, method 1000 of FIG. 10A, method 1000-a of FIG. 10B, and/or method 1100 of FIG. 11.

In this combination of systems and methods 1200, a system may be oriented along a single conic axis 1201, where a projector azimuth angle 1202 and a projector elevation angle may be described with respect to a projector reference axis 1204, and a camera azimuth angle 1233 and a camera elevation angle 1205 may be described with respect to a camera reference axis 1206. Going further in the description of this example, a pattern projector may be constructed of a convex reflector 1207 where a pattern generator may be placed at location 1208, and a camera may be constructed of a convex reflector 1209 where a pinhole camera may be placed at a location 1210. The combination of these elements may describe one embodiment of a 3D catadioptric system similar to system 100 and/or system 500, and this system embodiment may be further combined with one or more methods for estimating a 3D location 1211, a projector pattern configuration 1212, and/or a detected image configuration 1213, to estimate a position 1214 on an object 1215 in a scene which may contain one or more additional objects 1216. In some embodiments, the elements associated with the projector may be associated with the camera and the elements associated with the camera may be associated with the projector. In some embodiments, the camera conic axis 1233 and the projector conic axis 1202 may break the requirement for a collinear arrangement. In some embodiments, the convex reflector 1207 and its associated elements may be reconfigured such that said reflector is convex up.

In the combination of systems and methods 1200, the projected pattern configuration 1212 may include a set of one or more radially varying pattern configurations 1217 and 1218 where the scale of the patterns may vary radially. The axes 1219 and 1220 of the projected patterns may be considered to be the spatial coordinates of a mask placed in an ideal pinhole projector. One should consider this description merely an example of the projected pattern configuration. Other embodiments of the projected pattern configuration may be derived from the collection 800 of pattern types or collection 900 of pattern configurations, the projected patterns may be constructed using other definitions of the axes, and the projector may be constructed using projectors, such as projector 200 of FIG. 2A or projector 200-a of FIG. 2B, for example In the combination of systems and methods 1200, the detected image configuration 1213 may include a set of one or more radially varying pattern configurations 1221 and 1222. The axes 1223 and 1224 of the detected images may be the spatial coordinates of an image plane within an ideal pinhole camera. One should consider this description merely as an example of the detected pattern configuration. Other embodiments of the detected pattern may be derived from the collection 800 of pattern types or collection 900 of pattern configurations, the detected image may be collected on other axes, and the camera may be constructed using cameras such as camera 701, 702, or 703 of FIG. 7, for example.

By coordinating a combination of two or more of the preceding examples of 3D catadioptric systems, pattern configurations 1212, and detected images 1213, methods for the estimation of a 3D position 1211 may produce a measurement of at least one position 1214 on one object 1215. In some embodiments of methods 1212, the detected image is warped 1225 to produce two warped images 1226 and 1227 on a map where the axes may substantially represent a function of the elevation angle 1228 and the azimuth angle 1229. Continuing with further variations of the method embodiment 1211, a set of one or more image pixels across one or more warped images may be used to calculate the projector elevation angles 1230. In some embodiments where the projected pattern is derived from a set of two or more fringes including but not limited to 805 and 806, and where the directions of pattern variation 811 and 812 are substantially aligned to the projector elevation angle 1203, the calculation of the projector angle 1230 may include the calculation of the phase of such fringes and the mapping of said phase to the projector elevation angle. Stepping further, the measure of the camera azimuth and camera elevation 1231 may be based on the calibration of the camera image sensor and the calculation of the 3D locations 1232 may include a triangulation based on a projector elevation angle, a camera elevation angle, a camera azimuth angle, a baseline, and an geometry based on two rays 1234 and 1235, or similarly 1236 and 1237, extending to a point on the object 1214. In some embodiments, the systems and methods combination 1200 may produce an estimate of a position 1214 on one or more objects 1215 and 1216.

Some embodiments may use methods including but not limited to those described in FIG. 10A, FIG. 10B, and FIG. 11. In some embodiments, the warping of the detected image may be considered a conceptual framework rather than an implemented method. In some embodiments where the pattern may be derived from a spatial symbol pattern type 802 or 803, for example, then the method may be chosen to accommodate the pattern type.

Figure 13:
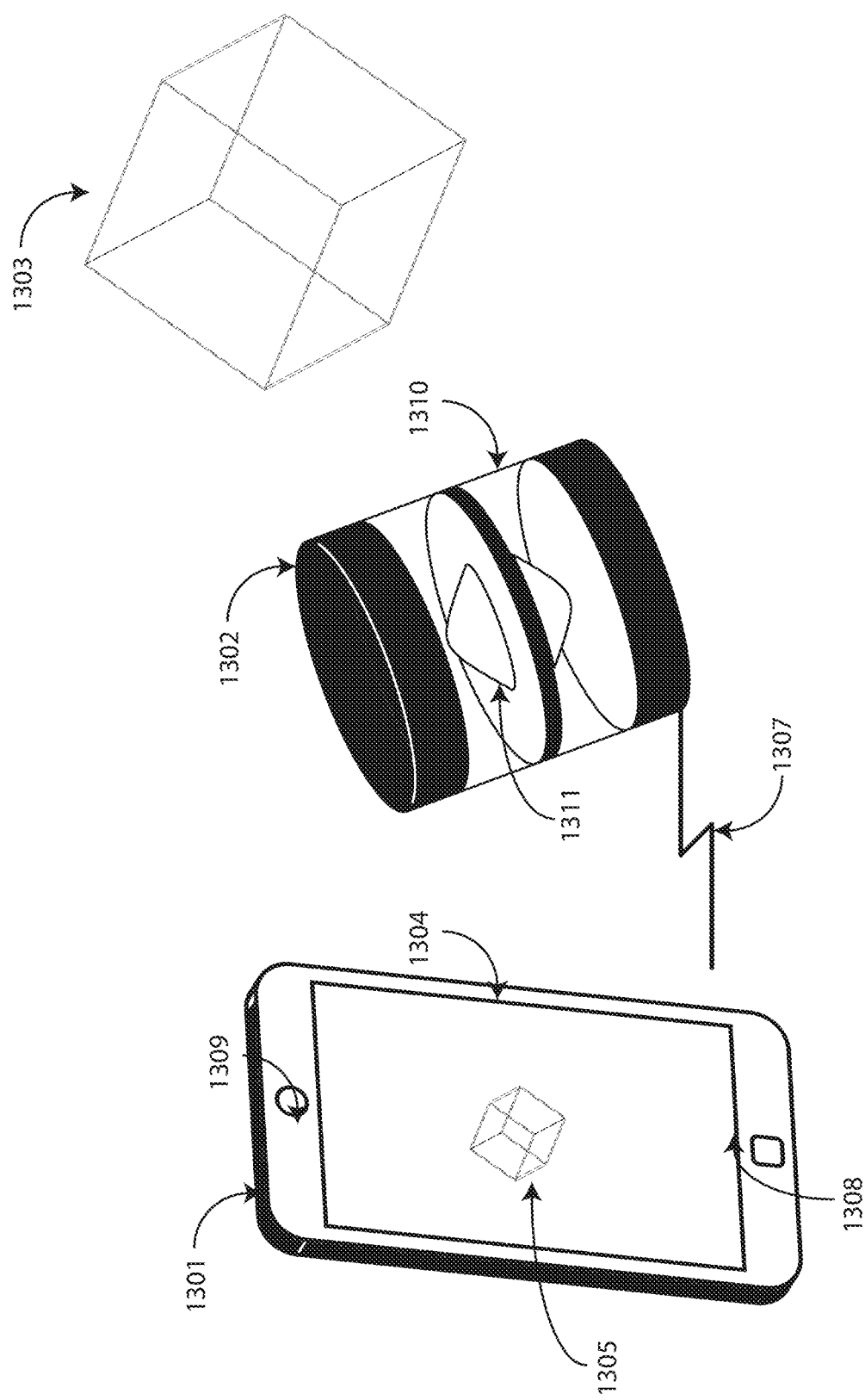
FIG. 13 shows a system in use in accordance with various embodiments.

FIG. 13 illustrates a 3D catadioptric system 1302 in use in accordance with various embodiments. This example use includes an electronic device 1301, the 3D catadioptric system 1302, and an object of interest 1303.

In this example, the 3D catadioptric system 1302 may communicate 1307 with the electronic device 1301. Variations of communication 1307 may be wireless or wired communication. In some embodiments, the 3D catadioptric system 1302 communicates the output from the image sensor to the electronic device 1301, and the electronic device 1301, which may be a mobile device, may implement one or more aspects of a method, such as method 1000, method 1000-a, or method 1100. In some embodiments, the 3D catadioptric system 1302 includes a processor, and the processor may implement one or more aspects within the methods 1000, 1000-a, or 1100, for example, before communicating one or more 3D positions to the electronic device 1301.

Some embodiment of the electronic device 1301 may include the means 1304 to convey captured 3D positions 1305 to a person using said electronic device. In some embodiments, the electronic device 1301 may be a phone and the means 1304 may be a display. In some embodiments, the electronic device 1301 may be a game system and the means 1304 may be a virtual reality headset. In some embodiments, the electronic device 1301 may include a computer, a TV, a camera, a virtual reality system, an augmented reality system, a video game console, a robot, a toy, an appliance, an automobile, an aircraft, a boat, and/or a submarine. In some embodiments, the means 1304 may include a computer monitor, a TV, a printer, a conference room projector, a heads-up display, an inter-ocular imaging system, an optical implant, and/or a neural implant. In some embodiments of the electronic device 1301, there may include controls 1308 by which a user may manipulate the orientation, the scale, the texture, some other property of the captured 3D position 1305, or some property of the means 1304 to convey said positions. Some embodiments of the electronic device 1301 may include one or more additional sensors 1309, which may be combined with the captured 3D position 1305. Variations of the additional sensors 1309 may include, but are not limited to, a camera, a thermal imaging device, a 3D camera, a 3D catadioptric system, one or more accelerometers, and/or a magnetometer.

Another embodiment of the electronic device 1301 may utilize the captured 3D positions 1305 without conveying them to a user. In some embodiments, the electronic device 1301 may be a robot and the captured 3D positions 1305 may be used for routines including, but not limited to, navigation, end effector controls, actuator controls, diagnostics, object recognition, object detection, and/or object cataloging. In some embodiments, the electronic device 1301 may be a phone and the captured 3D positions 1305 may be stored and used to unlock the device, capture the position and orientation of the electronic device 1309, and/or capture the position and orientation of the 3D catadioptric system 1302.

System 1302 may be an example of system 100 of FIG. 1, system 500 of FIG. 5, system 600 of FIG. 6, and/or the combination of systems and methods 1200 of FIG. 12. 3D catadioptric system 1302 may additionally incorporate catadioptric projectors such as those described in FIG. 1, FIG. 2A, FIG. 2B, and/or FIG. 3. System 1302 may utilize catadioptric cameras such as those described in FIG. 1 and/or FIG. 7, pattern configurations such as those described in FIG. 8 or FIG. 9. These variations may involve changes to the imaging optics 1311 employed in the construction of the 3D catadioptric system 1302. These various examples may employ various methods for the estimation of a 3D position including but not limited to those described by FIG. 10A, FIG. 10B, FIG. 11, or FIG. 12. Furthermore, 3D catadioptric system 1302 may be used in coordination with other 3D catadioptric systems 1302. In some cases, the 3D catadioptric system 1302 may be embedded in the electronic device 1301. Other embodiments of the 3D catadioptric system 1302 may include a cover 1310. In some embodiments, the cover 1310 may include a transparent material, a spectral filter, colored glass, and/or tinted glass. In some embodiments, the 3D catadioptric system 1302 may take the shape of a cylinder, a ball, and/or a box.

While detailed descriptions of one or more embodiments have been given above, various alternatives, modifications, and equivalents will be apparent to those skilled in the art without varying from the spirit of the different embodiments. Moreover, except where clearly inappropriate or otherwise expressly noted, it should be assumed that the features, devices, and/or components of different embodiments may be substituted and/or combined. Thus, the above description should not be taken as limiting the scope of the different embodiments, which may be defined by the appended claims.

What is claimed is:

1. A system comprising:
   a catadioptric projector configured to produce patterned illumination, wherein the catadioptric projector includes:
   a radiation source;
   a static pattern generating element with a radially varying pattern scale configured to condition radiation from the radiation source to produce the patterned illumination, wherein the radially varying pattern scale either decreases with distance from a center point along a ray extending from the center point or increases with distance from the center point along the ray extending from the center point; and
   a convex reflector positioned to project the patterned illumination such that the convex reflector introduces a change in pattern scale of the patterned illumination upon reflection; and
   a camera configured to acquire one or more images based on the patterned illumination.

2. The system of claim 1, wherein the patterned illumination includes at least an amplitude modulation in at least one spatial dimension, two spatial dimensions, or three spatial dimensions and the radially varying pattern scale is configured such that the patterned illumination includes a uniform pattern scale along at least one of the spatial dimensions.

3. The system of claim 2, wherein the amplitude modulation is configured to include a plurality of spatial symbols, wherein each spatial symbol is distinguishable from the other spatial symbols of the plurality of spatial symbols.

4. The system of claim 3, wherein each respective spatial symbol of the plurality of spatial symbols is similar to a master spatial symbol such that a peak of a normalized spatial cross correlation of the master spatial symbol and each respective spatial symbol exceeds a threshold.

5. The system of claim 1, wherein the camera includes a catadioptric camera.

6. The system of claim 5, wherein:
the catadioptric projector includes a primary optical axis;
the catadioptric camera includes a primary optical axis; and
the primary axes of the catadioptric projector and the catadioptric camera are substantially collinear.

7. The system of claim 1, wherein the catadioptric projector includes a lens.

8. The system of claim 1, wherein the static pattern generating element includes at least a mask, a diffractive optical element, or a hologram.

9. The system of claim 1, wherein the convex reflector includes at least a section of a hyperboloid, a paraboloid, an ellipsoid, a pyramid, or a cone.

10. The system of claim 1, wherein the convex reflector is rotationally symmetric.

11. The system of claim 1, wherein the patterned illumination is projected over an azimuthal field of view of 360 degrees.

12. The system of claim 1, wherein the patterned illumination is time-varying.

13. The system of claim 1, further comprising a processor configured to estimate a distance to a point on an object based on the one or more acquired images.

14. A catadioptric projector comprising:
a radiation source;
a static pattern generating element with a radially varying pattern scale configured to condition radiation from the radiation source to produce patterned illumination, wherein the radially varying pattern scale either decreases with distance from a center point along a ray extending from the center point or increases with distance from the center point along the ray extending from the center point; and
a convex reflector positioned to project the patterned illumination such that the convex reflector introduces a change in pattern scale of the patterned illumination upon reflection.

15. The projector of claim 14, wherein the catadioptric projector includes a lens.

16. The projector of claim 14, wherein the static pattern generating element includes at least a mask, a diffractive optical element, or a hologram.

17. The projector of claim 14, wherein the convex reflector includes at least a section of a hyperboloid, a paraboloid, an ellipsoid, a pyramid, or a cone.

18. The projector of claim 14, wherein the convex reflector is rotationally symmetric.

19. The projector of claim 14, wherein the patterned illumination is projected over an azimuthal field of view of 360 degrees.

20. The projector of claim 14, wherein the patterned illumination is time-varying.

21. A method comprising:
illuminating a scene with patterned illumination using a catadioptric projector with a static pattern generating element with a radially varying pattern scale, wherein the radially varying pattern scale either decreases with distance from a center point along a ray extending from the center point or increases with distance from the center point along the ray extending from the center point and the catadioptric projector projects the patterned illumination such that the catadioptric projector introduces a change in pattern scale of the patterned illumination upon reflection from a convex reflector; and
acquiring one or more images of the scene.

22. The method of claim 21, further comprising estimating a distance to a point on an object in the scene based on the one or more acquired images.

23. The method of claim 22, further comprising comparing the one or more acquired images with one or more stored reference images.

24. The method of claim 22, wherein the patterned illumination includes a plurality of spatial symbols, wherein each spatial symbol is distinguishable from the other spatial symbols of the plurality of spatial symbols; and wherein estimating the distance to the point on the object in the scene based on the one or more acquired images includes identification of one or more spatial symbols of the plurality of spatial symbols.

25. The system of claim 1, wherein the convex reflector introduces the change in pattern scale of the pattern illumination upon reflection such that the patterned illumination includes a substantially uniform scale upon the reflection.

26. The projector of claim 14, wherein the convex reflector introduces the change in pattern scale of the pattern illumination upon reflection such that the patterned illumination includes a substantially uniform scale upon the reflection.

27. The method of claim 21, wherein the convex reflector introduces the change in pattern scale of the pattern illumination upon reflection such that the patterned illumination includes a substantially uniform scale upon the reflection.

* * * * *